(12) United States Patent
Chinen et al.

(10) Patent No.: US 8,245,042 B2
(45) Date of Patent: Aug. 14, 2012

(54) SHIELDING A SENSITIVE FILE

(75) Inventors: Mitsuru Chinen, Kanagawa (JP);
Shinsuke Noda, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 12/623,473

(22) Filed: Nov. 23, 2009

(65) Prior Publication Data

US 2010/0138656 A1 Jun. 3, 2010

(30) Foreign Application Priority Data

Nov. 28, 2008 (JP) ................................ 2008-304859

(51) Int. Cl.
*H04L 9/32* (2006.01)
*G06F 7/04* (2006.01)
*H04N 7/167* (2011.01)
*H04L 9/08* (2006.01)

(52) U.S. Cl. .............. 713/171; 726/2; 726/27; 380/241; 380/278; 380/285

(58) Field of Classification Search .................. 713/171; 726/2, 27; 380/241, 278, 285
See application file for complete search history.

(56) References Cited

U.S. PATENT DOCUMENTS

| 8,094,824 B2 * | 1/2012 | Hatano et al. ................. 380/284 |
| 2007/0256141 A1 * | 11/2007 | Nakano et al. .................. 726/27 |
| 2008/0049934 A1 * | 2/2008 | Onoda et al. .................. 380/201 |
| 2009/0235303 A1 * | 9/2009 | Yamaoka et al. ............... 725/31 |

FOREIGN PATENT DOCUMENTS

| JP | 2004-094290 | 3/2004 |
| JP | 2006-033753 A | 2/2006 |
| JP | 2008-026925 | 2/2008 |
| WO | 2007/119324 | 10/2007 |

* cited by examiner

*Primary Examiner* — Mohammad W Reza
(74) *Attorney, Agent, or Firm* — Jeffrey T. Holman

(57) ABSTRACT

Embodiments of the invention provide for shielding a sensitive file on a computer that can connect to a server computer via a network. The computer may determine whether it complies with security compliance requirements sent from another computer or not in response to a read instruction or a write instruction of the sensitive file by application software, and encrypt the sensitive file with an encryption key.

21 Claims, 18 Drawing Sheets

CLIENT COMPUTER SIDE

| COMPONENT NAME | | CONTENT |
|---|---|---|
| COMPLIANCE REQUIREMENTS STORING UNIT (CLIENT SIDE) | 104 | VERSION OF COMPLIANCE REQUIREMENTS, COMPLIANCE REQUIREMENTS |
| ENCRYPTION KEY STORING UNIT | 105 | ENCRYPTION KEY ID, ENCRYPTION KEY |
| DECRYPTION KEY STORING UNIT | 106 | ENCRYPTION KEY ID, DECRYPTION KEY |
| ENCRYPTION OBJECT STORING UNIT | 107 | FILE INFORMATION TO BE SENSITIVE FILE |

131

SERVER COMPUTER SIDE

| COMPONENT NAME | | CONTENT |
|---|---|---|
| COMPLIANCE REQUIREMENTS STORING UNIT (SERVER SIDE) | 104 | VERSION OF COMPLIANCE REQUIREMENTS, COMPLIANCE REQUIREMENTS |
| ENCRYPTION KEY-DECRYPTION KEY STORING UNIT | 125 | ENCRYPTION KEY ID, ENCRYPTION KEY, DECRYPTION KEY, VERSION OF COMPLIANCE REQUIREMENTS |
| ACCESS AUTHORITY STORING UNIT | 104 | USER INFORMATION, WHETHER USER IS AUTHORIZED TO ACCESS OR NOT |

[Figure 2A]
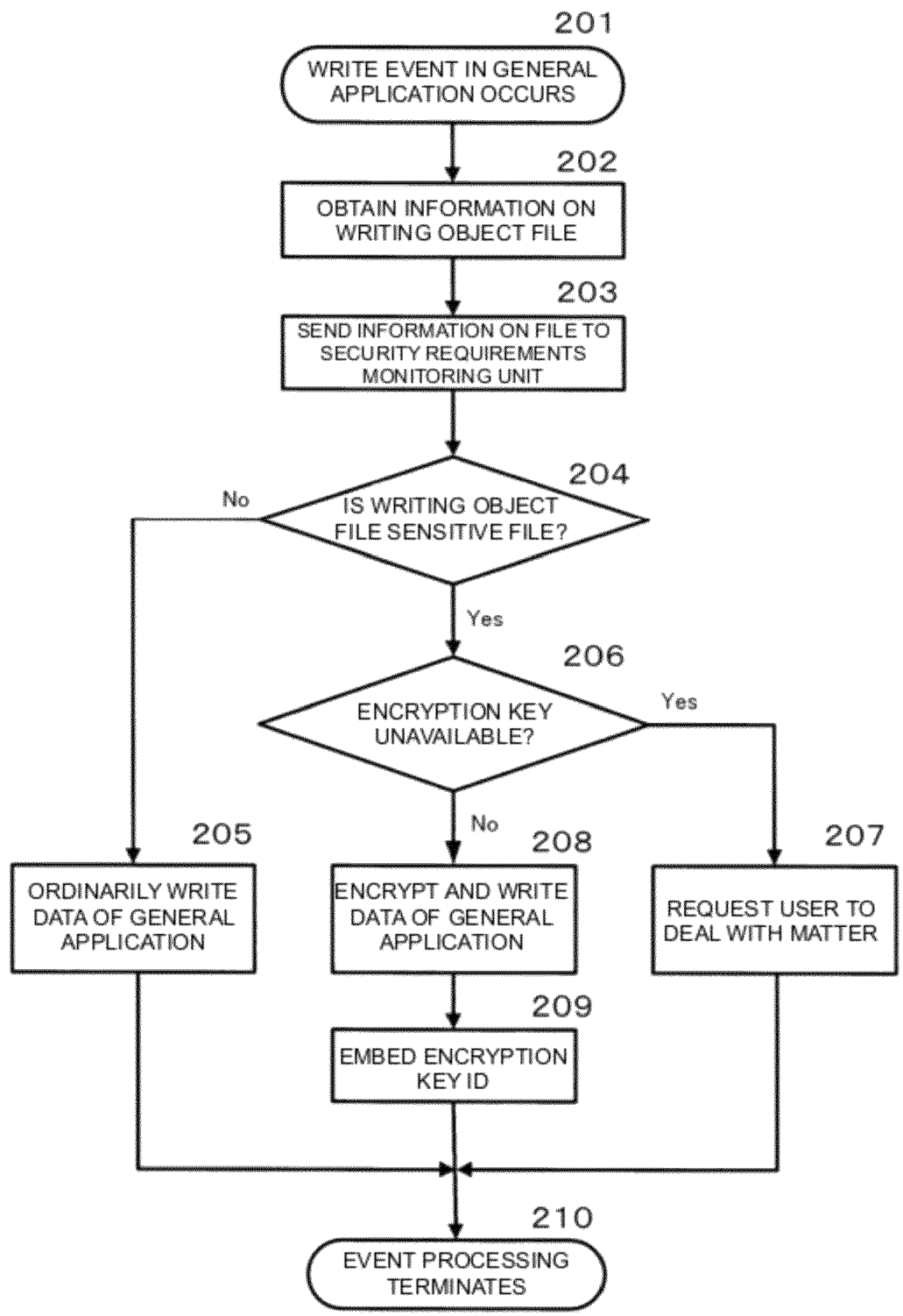

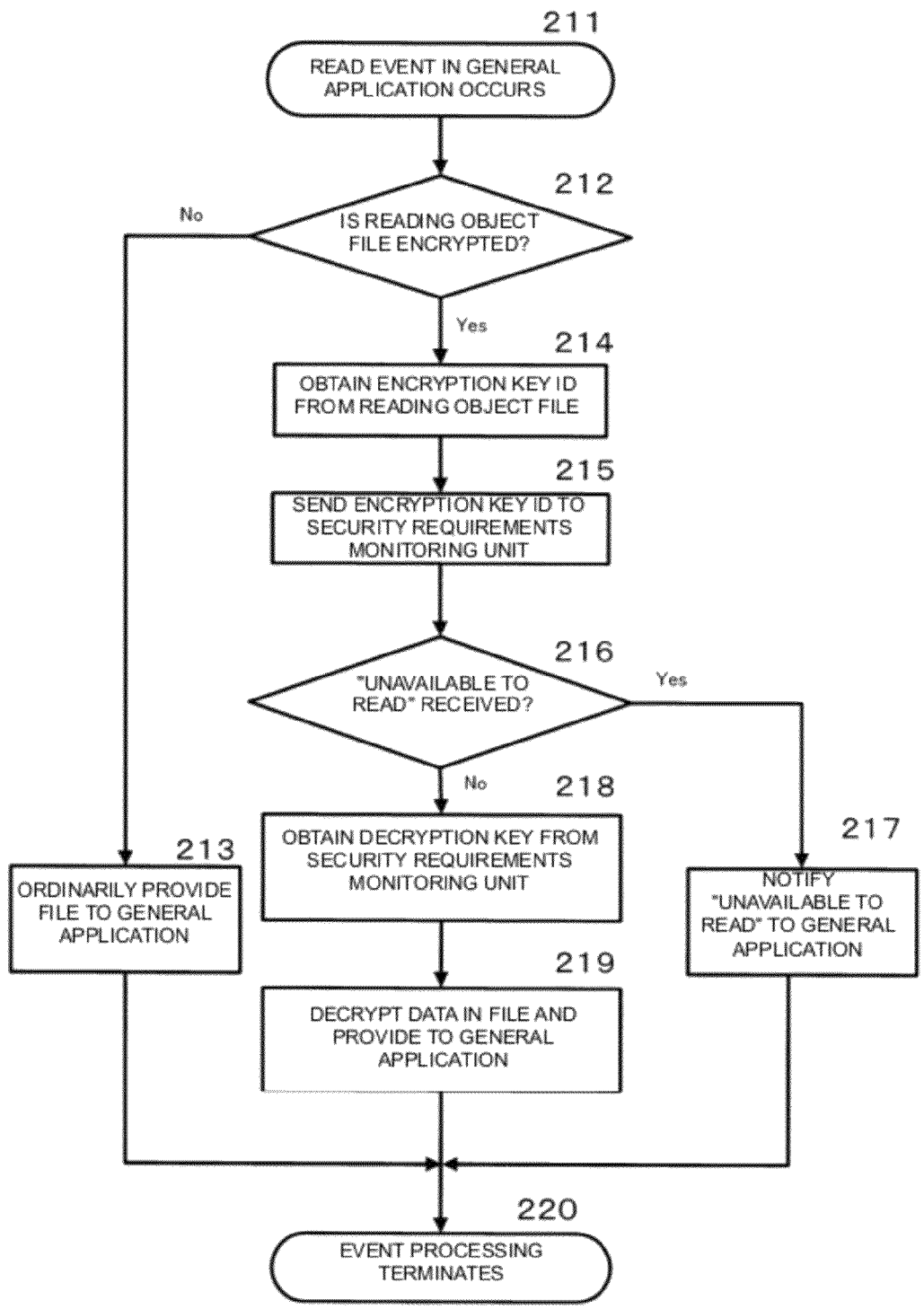
[Figure 2B]

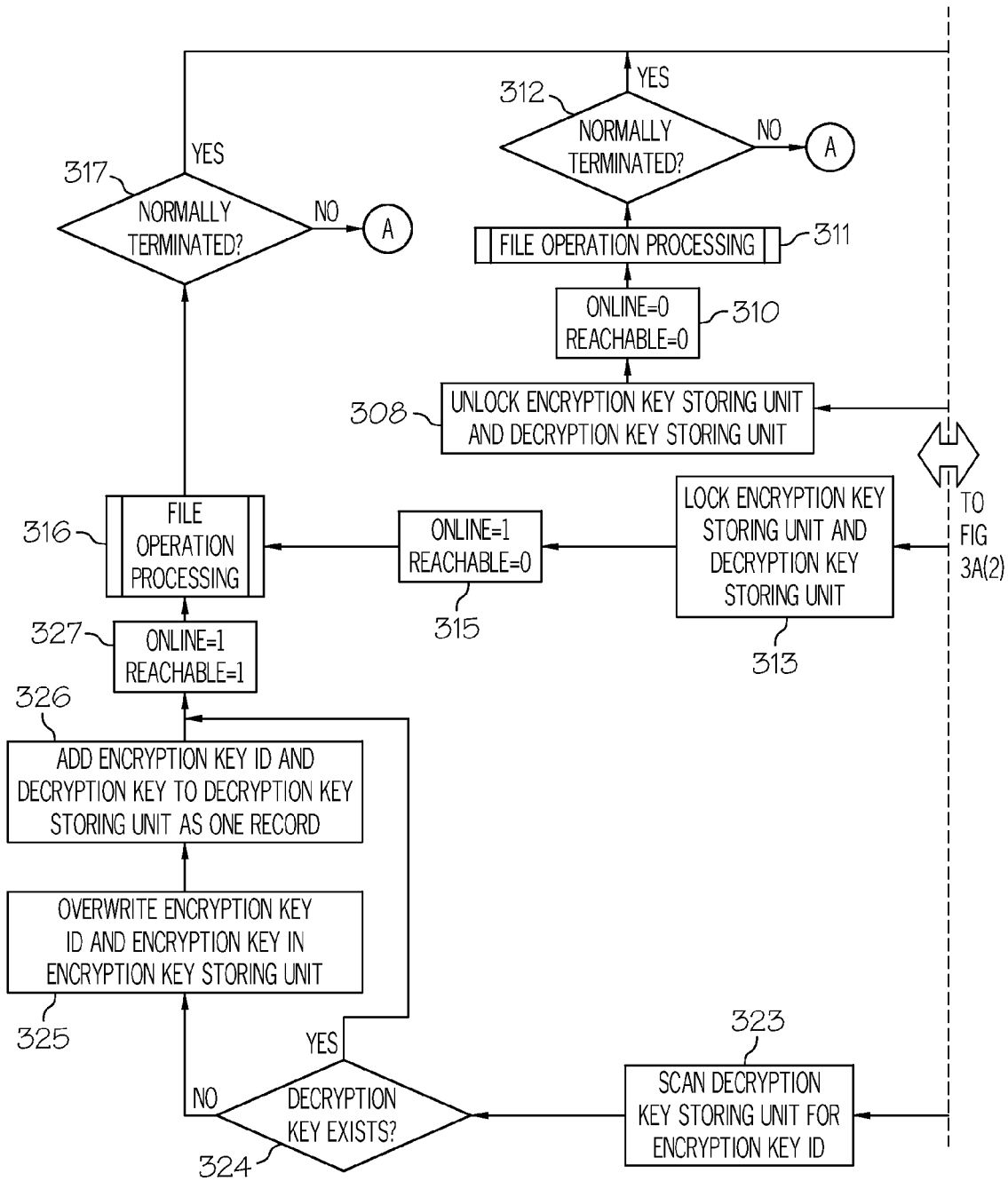
FIG. 3A(1)

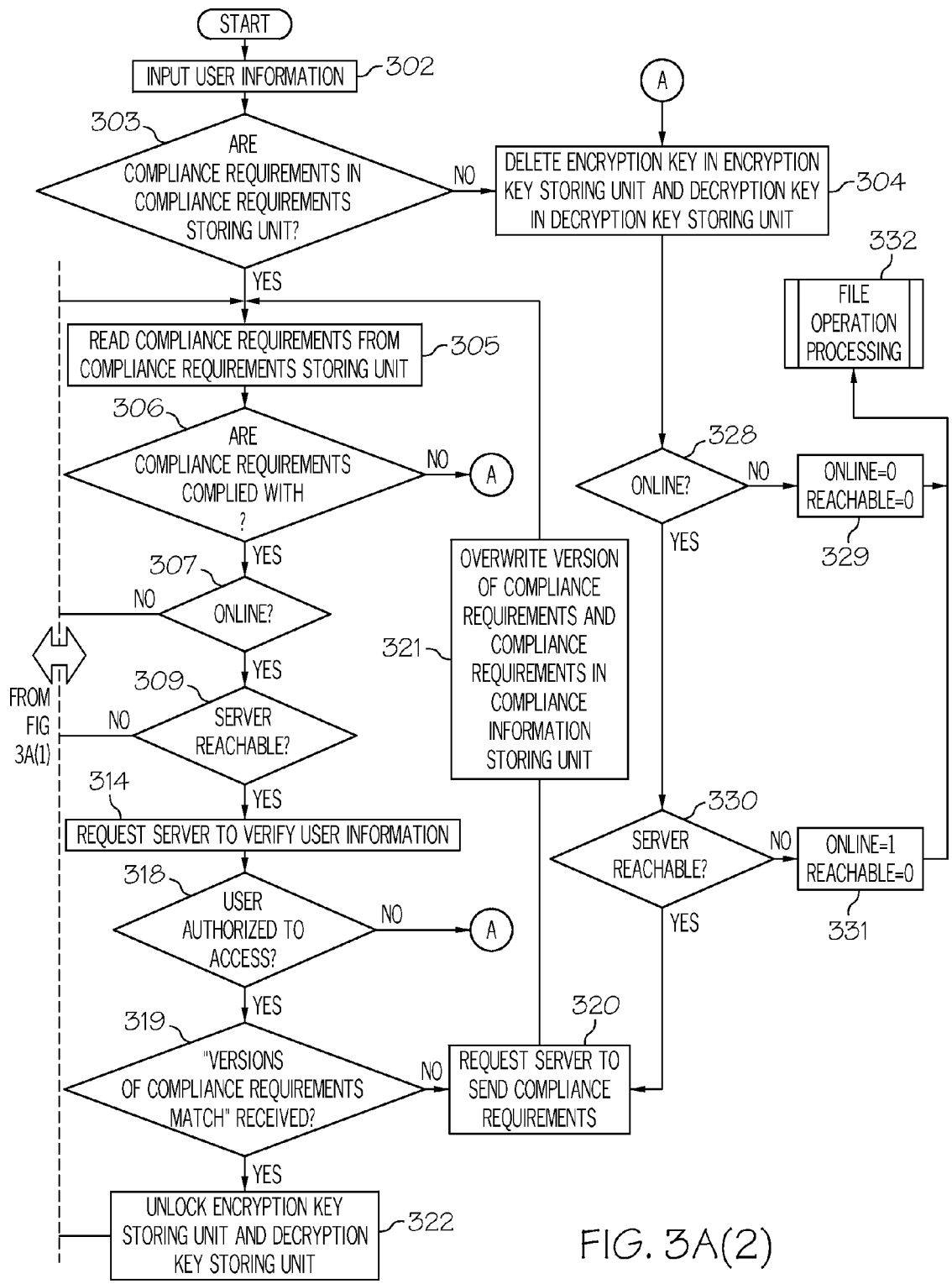
FIG. 3A(2)

[Figure 3B]
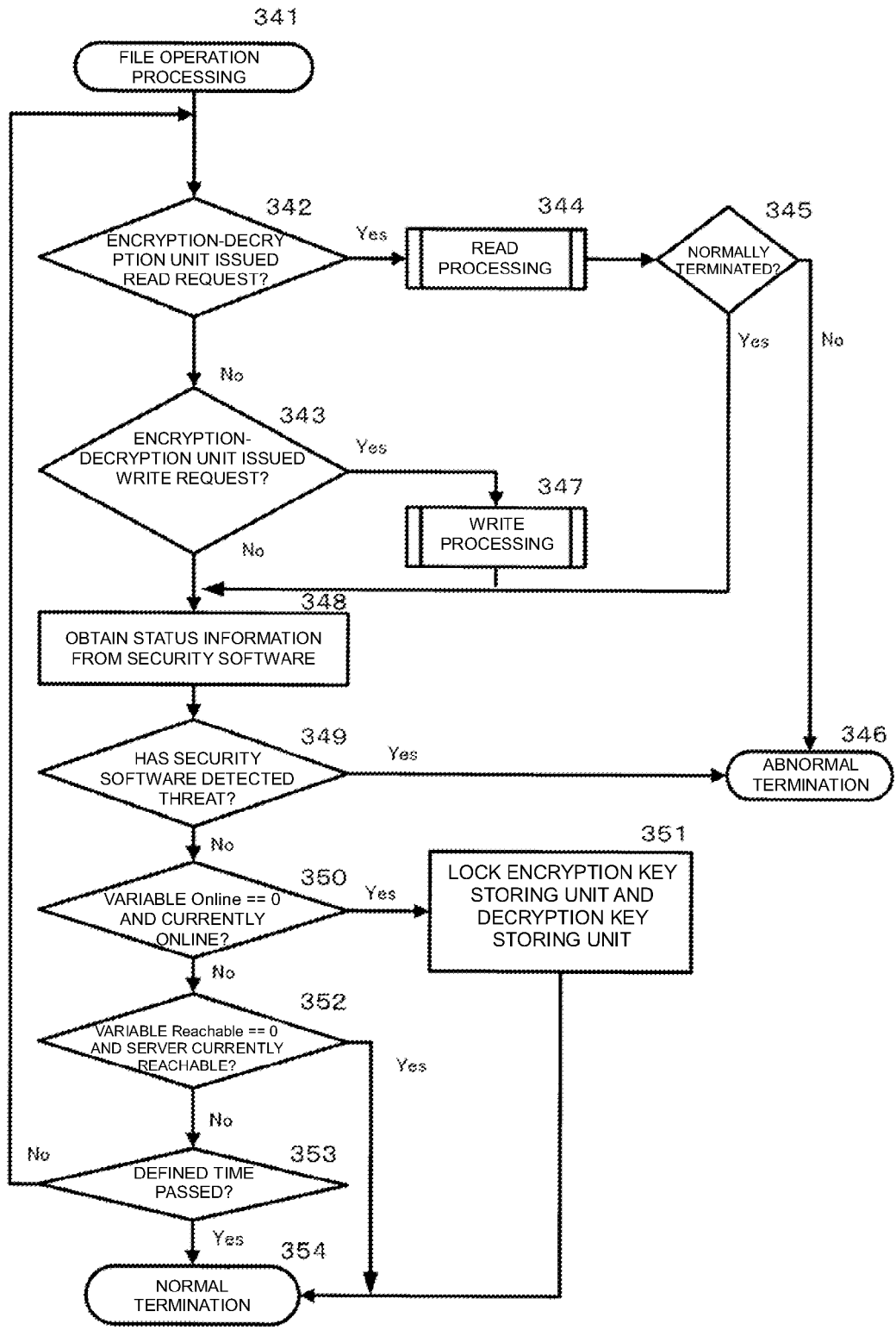

[Figure 3C]
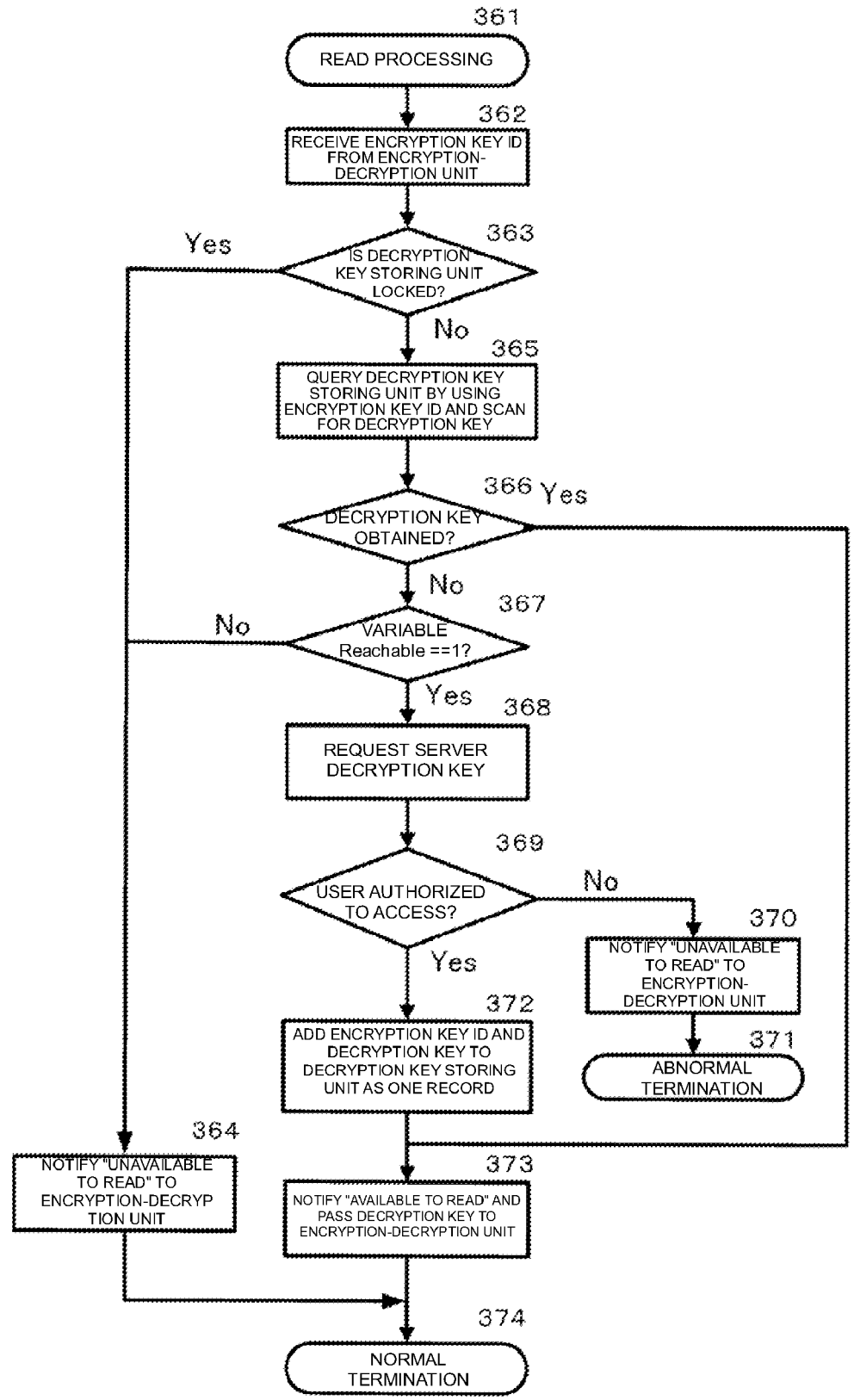

[Figure 3D]
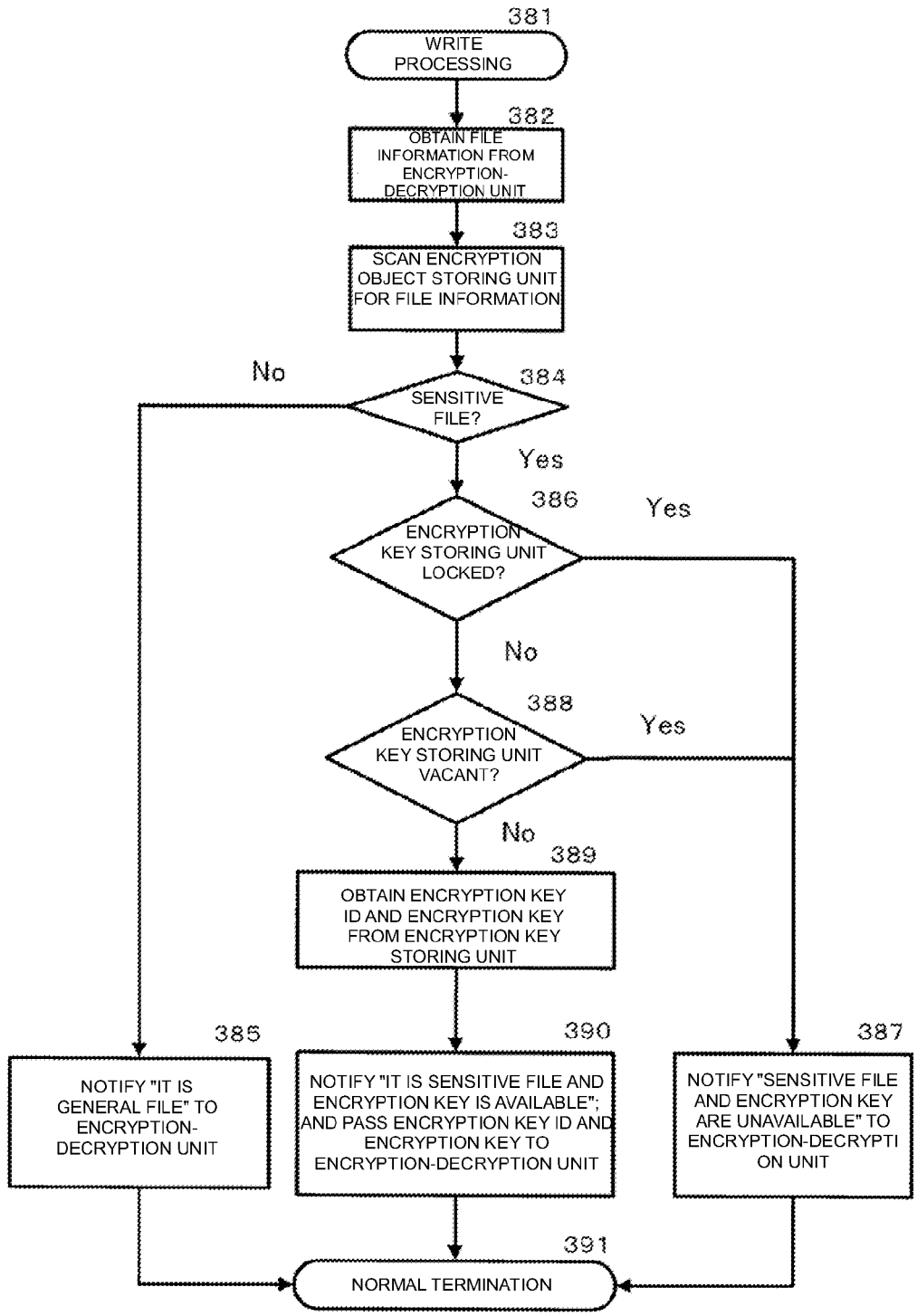

[Figure 4B]
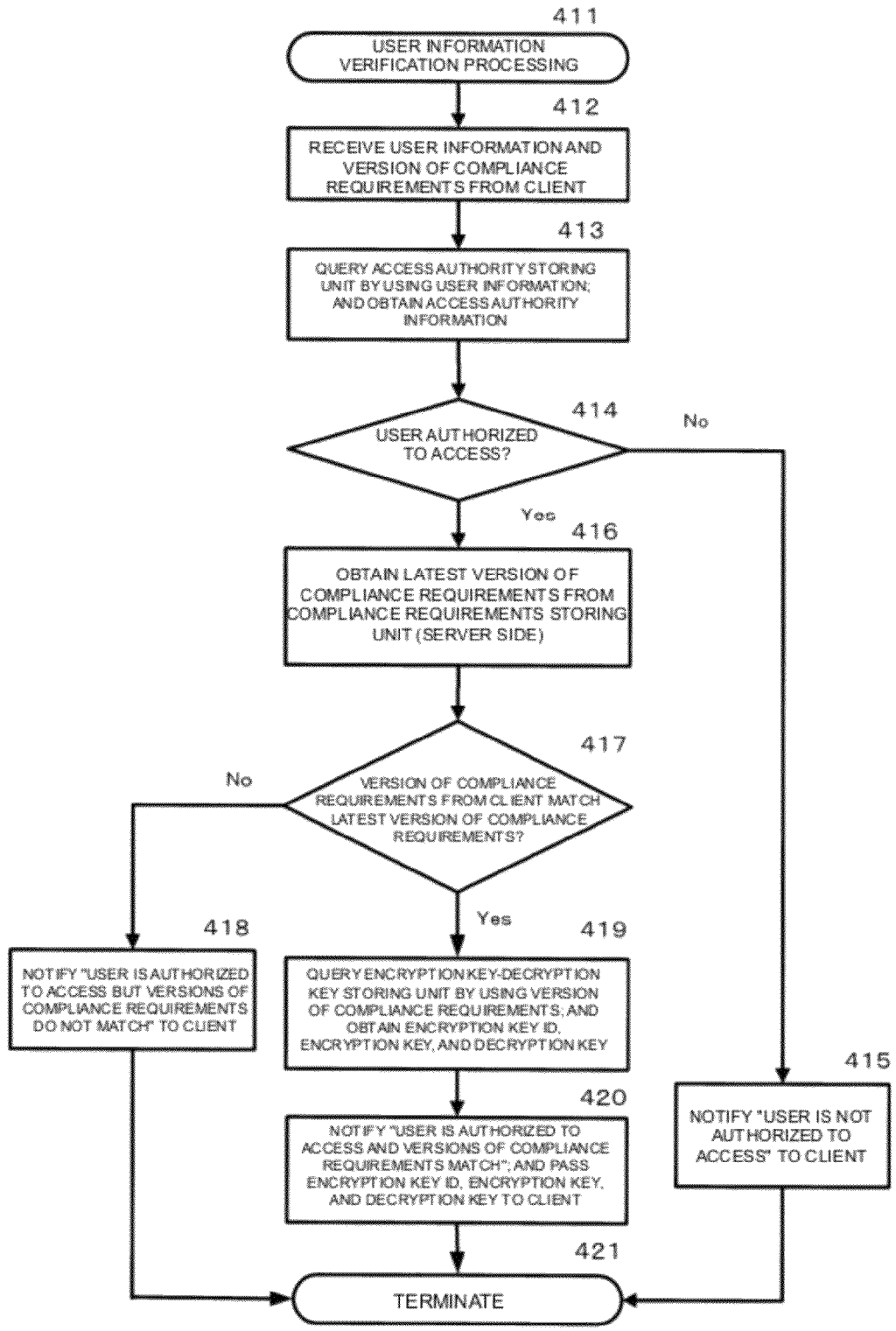

[Figure 4C]
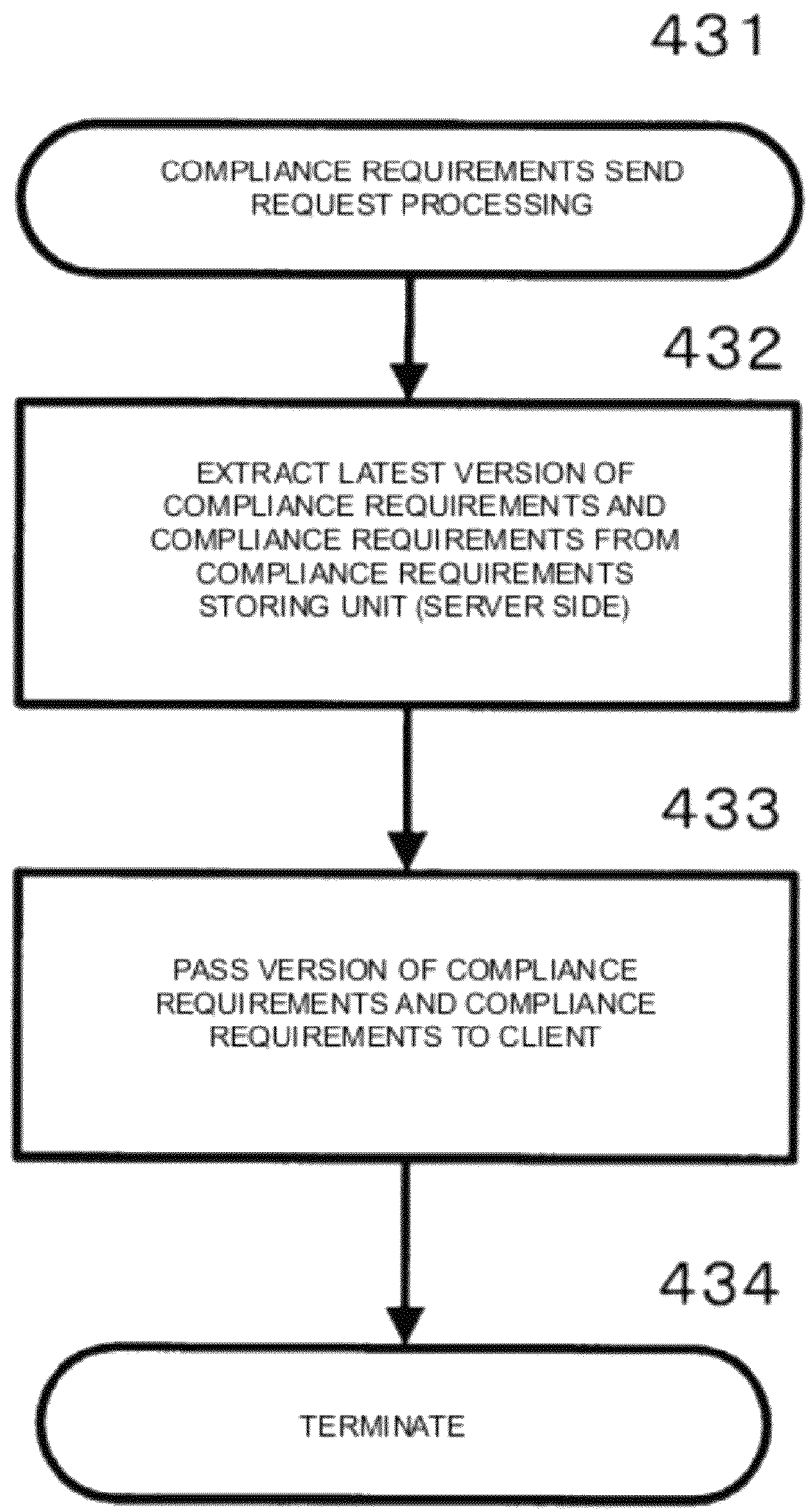

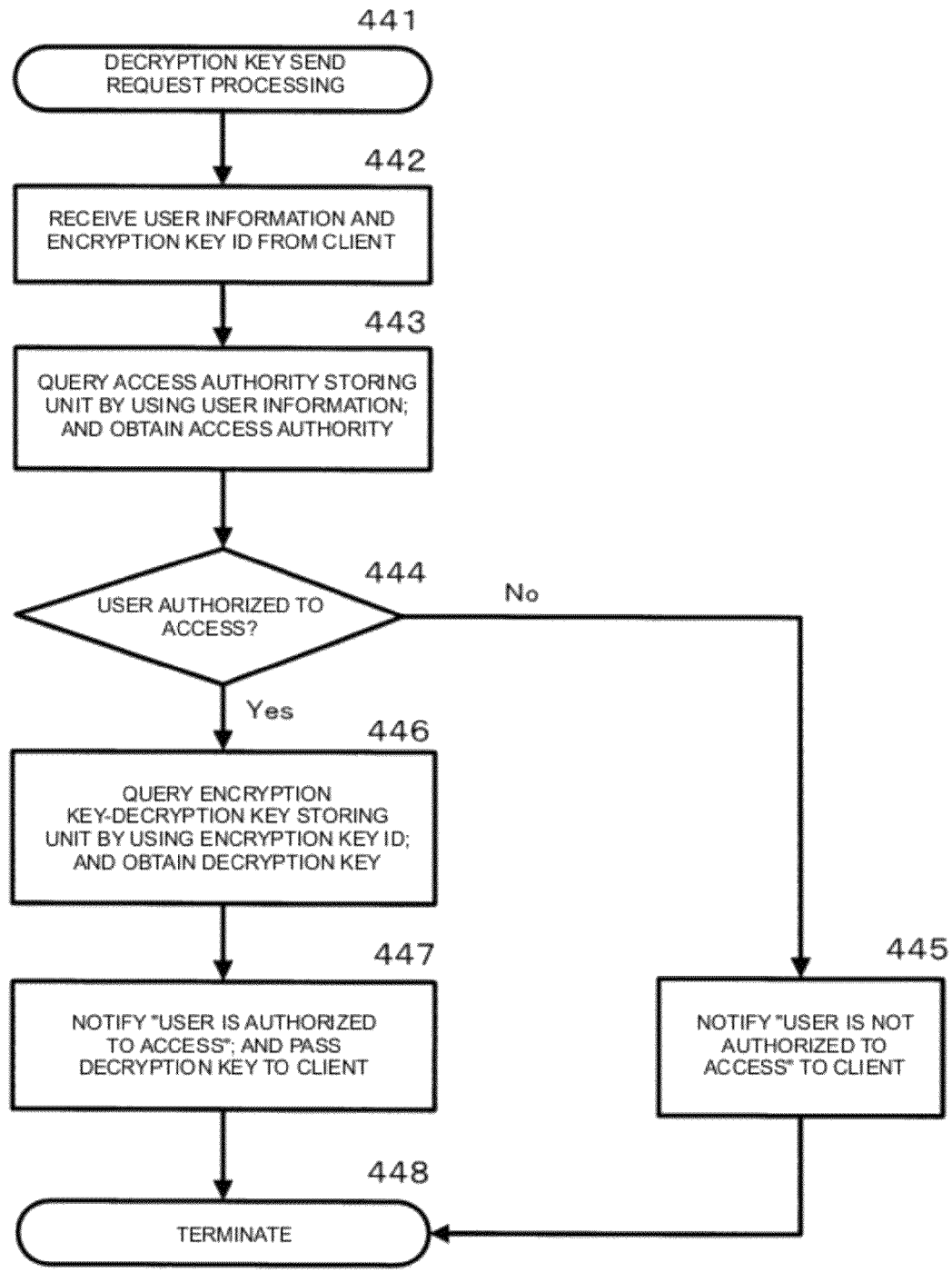
[Figure 4D]

[Figure 5]
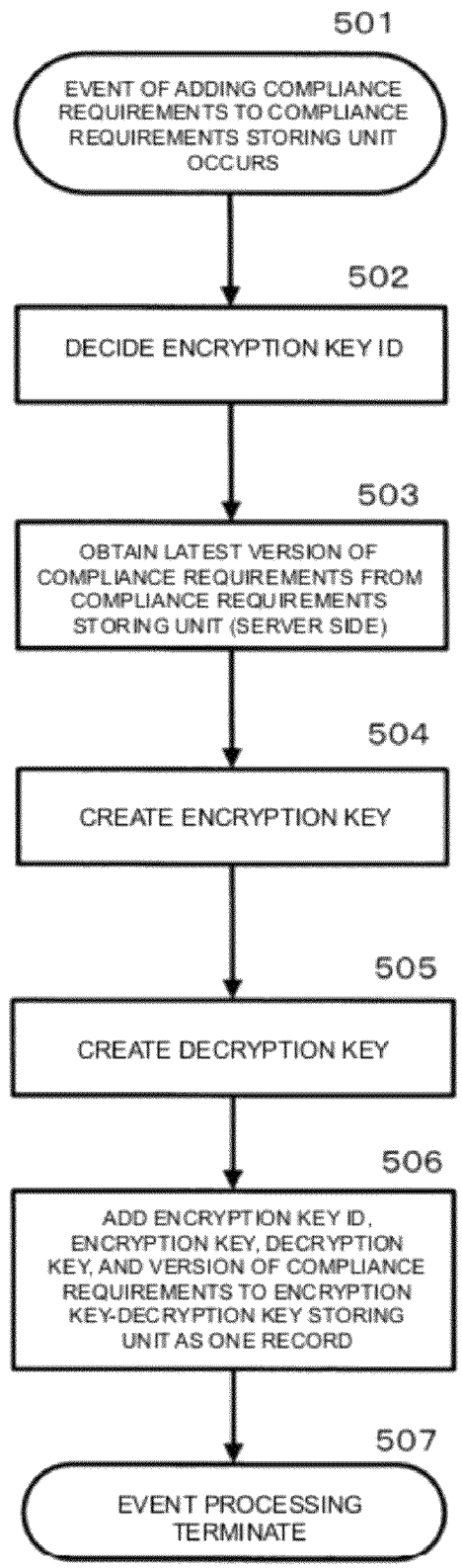

| FIGURE, STEP | REQUESTING SIDE | DATA SENT FROM REQUESTING SIDE | REQUESTED SIDE | DATA SENT FROM REQUESTED SIDE |
|---|---|---|---|---|
| FIGURE 3A, STEP 314<br>FIGURE 4A, STEP 402 | SECURITY REQUIREMENTS MONITORING UNIT (102) | • USER INFORMATION<br>• VERSION OF COMPLIANCE REQUIREMENTS | SECURITY VERIFYING UNIT (122) | • WHETHER AUTHORIZED TO ACCESS OR NOT<br>• WHETHER VERSIONS OF COMPLIANCE REQUIREMENTS MATCH OR NOT OR NULL VALUE<br>• ENCRYPTION KEY ID OR NULL VALUE<br>• ENCRYPTION KEY OR NULL VALUE<br>• DECRYPTION KEY OR NULL VALUE |
| FIGURE 3A, STEP 320<br>FIGURE 4A, STEP 404 | SECURITY REQUIREMENTS MONITORING UNIT (102) | NONE | SECURITY VERIFYING UNIT (122) | • VERSION OF COMPLIANCE REQUIREMENTS<br>• COMPLIANCE REQUIREMENTS |
| FIGURE 3C, STEP 368<br>FIGURE 4A, STEP 406 | SECURITY REQUIREMENTS MONITORING UNIT (102) | • USER INFORMATION<br>• ENCRYPTION KEY ID | SECURITY VERIFYING UNIT (122) | • WHETHER AUTHORIZED TO ACCESS OR NOT<br>• DECRYPTION KEY OR NULL VALUE |
| FIGURE 2B, STEP 215<br>FIGURE 3B, STEP 342 | ENCRYPTION-DECRYPTION UNIT (103) | • ENCRYPTION KEY ID | SECURITY REQUIREMENTS MONITORING UNIT (102) | • AVAILABLE/UNAVAILABLE TO READ<br>• DECRYPTION KEY OR NULL VALUE |
| FIGURE 2A, STEP 203<br>FIGURE 3B, STEP 343 | ENCRYPTION-DECRYPTION UNIT (103) | • FILE INFORMATION OF SENSITIVE FILE | SECURITY REQUIREMENTS MONITORING UNIT (122) | • FILE TYPE (SENSITIVE/GENERAL)<br>• ENCRYPTION KEY AVAILABLE/UNAVAILABLE OR NULL VALUE<br>• ENCRYPTION KEY ID OR NULL VALUE<br>• ENCRYPTION KEY OR NULL VALUE |

FIG. 6

SHIELDING A SENSITIVE FILE

FIELD

Embodiments of the invention relate to computing, and specifically to shielding a sensitive file.

BACKGROUND

Many cases of sensitive information leakage have occurred by file sharing software such as P2P. Those cases have been caused by such reasons as an insufficient security guard of the personal computer (hereinafter, referred to as PC). For the purpose of preventing recurrence of such sensitive information leakage cases, corporations and public agencies adopt measures below:

A system administrator advances the security guard of a PC owned by each user.

Install security software such as antivirus software and spyware monitoring software onto a PC and instructs each user to comply with security compliance requirements.

Install a health check utility that monitors whether the PC of each user satisfies the defined security compliance requirements onto each PC.

The system administrator forbids users to use removable media that may be connected to a PC with insufficient security guard such as a portable hard disk, USB memory, card memory and the like. For the purpose of forbidding the users to use the media, the system administrator disables the USB slot at the BIOS level and limits access to the BIOS by using passwords.

The system administrator instructs staff users to encrypt files in order to prevent those other than the staff users from viewing the information.

Even with the above-described guard, the PC may be subjected to illegal access when a user forgets to update a definition file of the security software. In addition, the above-described guard requires the user to perform an additional task when the user is to bring out a file or a task of encrypting a file at each time when the user operates the file. That lowers usability of each user, and further degrades the work efficiency of the office work.

SUMMARY

Embodiments of the invention provide for shielding a sensitive file on a computer that can connect to a server computer via a network. The computer may determine whether it complies with security compliance requirements sent from another computer or not in response to a read instruction or a write instruction of the sensitive file by application software, and encrypt the sensitive file with an encryption key.

BRIEF DESCRIPTION OF THE DRAWINGS

FIG. 1C shows an example of contents included in respective components of the client computer (101) and the server computer (121) of embodiments of the present invention;

FIG. 2A shows an operation flowchart of file encryption and file writing by the encryption-decryption unit (103) of an embodiment of the present invention;

FIG. 2B shows an operation flowchart of file decryption and file reading by the encryption-decryption unit (103) of the embodiment of the present invention;

FIG. 3A shows an operation flowchart of a security requirements monitoring unit (102) of an embodiment of the present invention;

FIG. 3B shows an operation flowchart of file operation by a security requirements monitoring unit (102) of an embodiment of the present invention;

FIG. 3C shows an operation flowchart of read processing of an encrypted sensitive file by the security requirements monitoring unit (102) of the embodiment of the present invention;

FIG. 3D shows an operation flowchart of write processing of a file by the security requirements monitoring unit (102) of the embodiment of the present invention;

FIG. 4B shows an operation flowchart of verify processing on user information in the security verifying unit (122) of the embodiment of the present invention;

FIG. 4C shows an operation flowchart of compliance requirements send request processing in the security verifying unit (122) of the embodiment of the present invention;

FIG. 4D shows an operation flowchart of decryption key send request processing in the security verifying unit (122) of the embodiment of the present invention;

FIG. 5 shows an operation flowchart at occurrence of an event of adding compliance requirements in the encryption key-decryption key creating unit (123) of an embodiment of the present invention;

FIG. 6 shows details at data exchange in an embodiment of the present invention.

DETAILED DESCRIPTION OF THE DRAWINGS

Figure 1A:
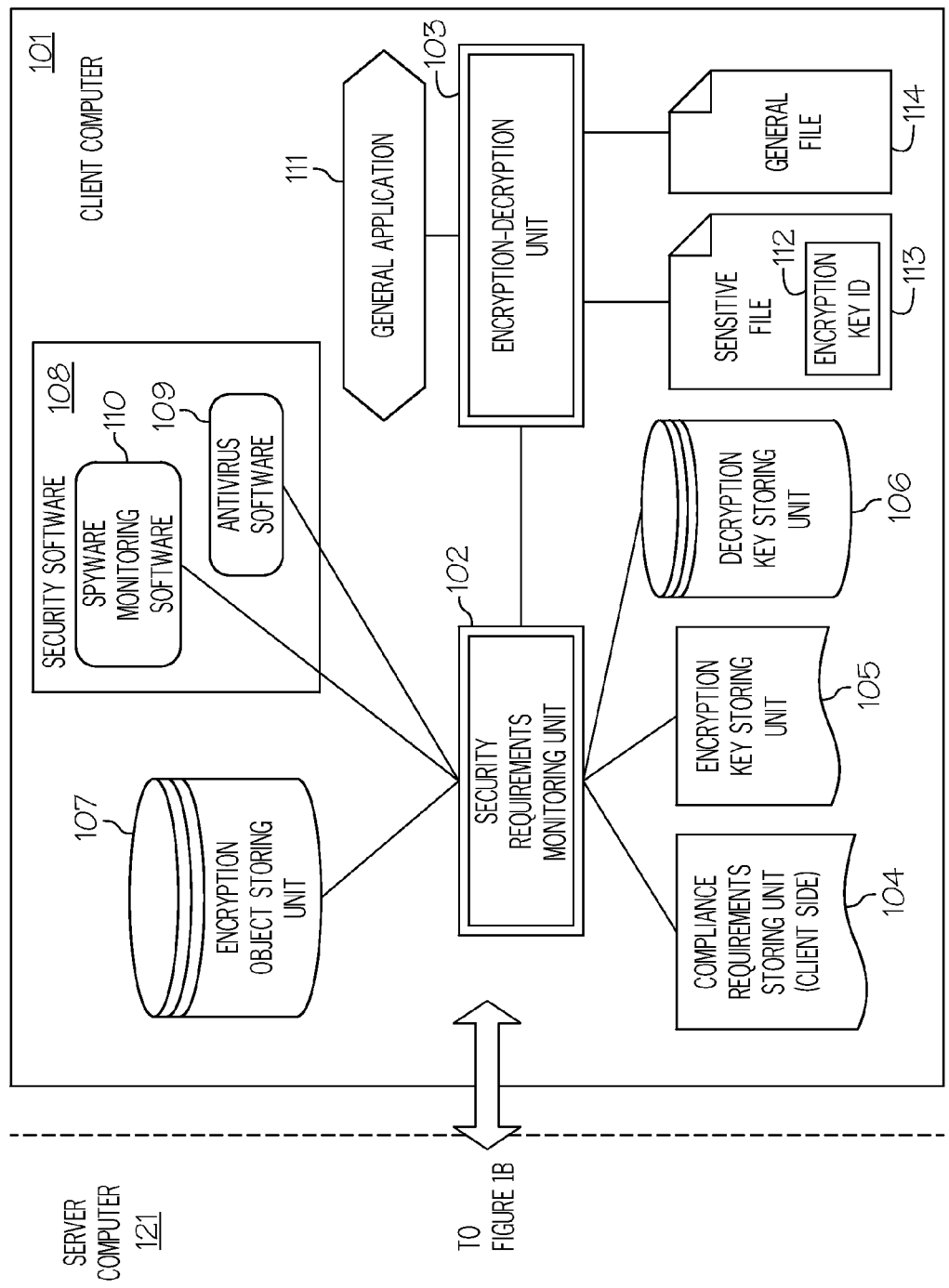
FIG. 1A shows an example of a configuration of a client computer of an embodiment of the present invention.

Embodiments of the present invention will be described below with reference to the drawings. It should be understood that the embodiments are for describing preferred aspects of the present invention and not intended to limit the scope of the present invention. In the drawings below, the same reference symbols designate the same objects, if otherwise described in particular.

FIG. 1A shows an example of a configuration of a client computer (101) of an embodiment of the present invention.

The client computer (101) includes a security requirements monitoring unit (102), an encryption-decryption unit (103), a compliance requirements storing unit (client side) (104), an encryption key storing unit (105), a decryption key storing unit (106), and an encryption object storing unit (107). In the client computer (101), security software (108) such as antivirus software (109) and spyware monitoring software (110), and general application (111) are installed in storage (not shown). In the client computer (101), an encrypted sensitive file (113) that includes an encryption key ID (112) or a general file (114) can be stored in the storage (not shown).

The security requirements monitoring unit (102) requests a server computer (121) to verify user information and send security compliance requirements, an encryption key, a decryption key, an encryption key ID, and whether authorized to access or not. The security requirements monitoring unit (102) also receives a report from the security software. The report includes a warning of virus detection by the antivirus software and a warning of spyware activity detection by the spyware monitoring software. The security requirements monitoring unit (102) also decides whether or not to authorize encryption or decryption based on the compliance status of the client computer (101). If the security requirements are not complied with, the security requirements monitoring unit (102) deletes the encryption key and the decryption key stored in the encryption key storing unit (105) and the decryption key storing unit (106). The security requirements monitoring unit (102) also judges of connection to a network and connection to the server computer (121). If the security requirements monitoring unit (102) judges that the client computer (101) connects to the network but cannot connect to the server computer (121), the security requirements monitoring unit (102) locks the encryption key storing unit (105) and the decryption key storing unit (106).

The encryption-decryption unit (103) encrypts the sensitive file (113) with the encryption key, writes the encrypted sensitive file to a storing unit, decrypts the encrypted sensitive file (113) with the decryption key, and reads the decrypted sensitive file. The encryption-decryption unit (103) writes and reads the general file that is not the sensitive file to and from the storing unit.

The compliance requirements storing unit (client side) (104) stores the version of the compliant requirements and the compliance requirements. The compliance requirements define the requirements that the client computer (101) should comply with. Requirements prepared for the security software, for example, may be applied as the compliance requirements. The compliance requirements are exemplified as below. Since the encryption-decryption unit (103) automatically encrypts and decrypts the sensitive file, the client computer that does not satisfy the compliance requirements rejects access to the sensitive file.

Security software should be installed
Updated data should be installed
The security software has reported no threat
The hard disk or a removable disk should be protected by a password
The screen saver should be protected by a password
A firewall should be installed
Shared information on the network has a predetermined name
Encryption should be set for the mail software
The account ID should be set to a predetermined number of characters or more
The account password should be updated by a predetermined period
A batch mode of the operating system should be applied
A service pack of the operating system should be applied
BIOS should set up according to a predetermined rule The compliance requirements are sent from the server computer (121) to the client computer (101). The compliance requirements are updated in the server computer (121). The updated compliance requirements are sent from the server computer (121) to the client computer (101). A new version is given to the updated compliance requirements each time the compliance requirements are updated. Since security compliance is not ensured for the computer that does not store the compliance requirements, the user of the computer is rejected to access the sensitive file.

The encryption key storing unit (105) is a recording medium for storing the encryption key ID and the encryption key corresponding to the encryption key ID. The encryption key is used for encrypting the sensitive file. The encryption key and the encryption key ID are sent from the server computer (121). The encryption key is identified by the encryption key ID. Since the decryption key that makes a pair with the encryption key is also identified by the same encryption key ID, a pair of the encryption key and the decryption key can be found. The encryption key storing unit (105) is typically an encryption-key cash. The encryption key is stored in the encryption-key cash because the encryption-key cash needs to be cleared when the security compliance requirements are changed. The clearance of the encryption-key cash includes deletion of the encryption key in the encryption-key cash.

The decryption key storing unit (106) is a recording medium for storing the encryption key ID and the decryption key corresponding to the encryption key ID. The decryption key is used for decrypting the encrypted sensitive file. The decryption key and the encryption key ID are sent from the server computer (121). The decryption key is identified by the encryption key ID. Since the encryption key that makes a pair with the decryption key is also identified by the same encryption key ID, a pair of the decryption key and the encryption key can be found. The decryption key storing unit (106) is typically a decryption-key cash database. The decryption key is stored in the database because the decryption keys for decryption varies for the sensitive files and the plurality of decryption keys need to be kept as a database.

The encryption object storing unit (107) stores data for identifying a file to be encrypted. The encryption object storing unit (107) is typically an encryption object database. The data for identifying the file to be encrypted can be decided according to whether the extension to the file is a predetermined extension or not; whether the file name includes a predetermined character string or not; whether data in the file includes a predetermined character string or not, or whether the file is in the removable medium or not, for example. The predetermined character string is comprised of characters indicating that it is classified such as "encryption", "classified", "confidential".

The security software (108) includes, but is not limited to, the antivirus software (109) and the spyware monitoring software (110), for example. The antivirus software (109) is effective against virus software. The spyware monitoring software (110) scans for spyware, adware and Trojan horse and monitors a currently running process.

The general application (111) includes word processing software, spread sheet software, presentation software, and drawing software.

The encryption key ID (112) is embedded in the sensitive file (113) in a binary form, for example. The same encryption key ID corresponds to the encryption key and the decryption key that makes a pair with the encryption key for identifying the decryption key used for decrypting the encrypted sensitive file.

The sensitive file (113) includes the content that the user does not desire to or is not desired to make open to the third party. The sensitive file may be a confidential file, a company secret file, an unpublished file, a patent application file, and a file submitted to a public agency.

The general file (114) includes the content that may be made open to the third party.

Figure 1B:
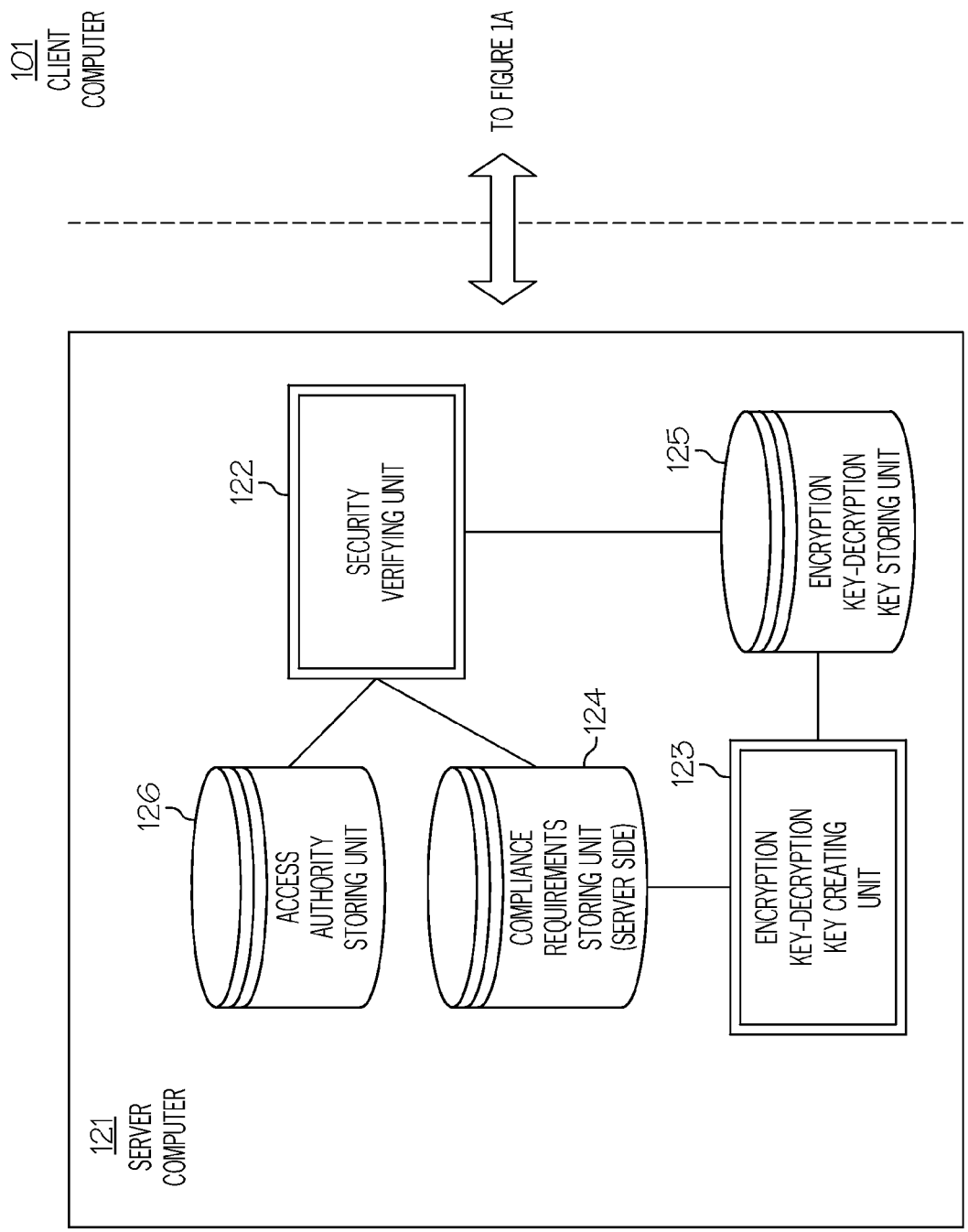
FIG. 1B shows an example of a configuration of a server computer (121) of an embodiment of the present invention.

FIG. 1B shows an example of a configuration of the server computer (121) of an embodiment of the present invention.

The server computer (121) includes a security verifying unit (122) and an encryption key-decryption key creating unit (123). The server computer (121) further includes a compliance requirements storing unit (server side) (124), an encryption key-decryption key storing unit (125), and an access authority storing unit (126).

The security verifying unit (122) selects the compliance requirements and the encryption key and the decryption key from the compliance requirements storing unit (server side) (124) and the encryption key-decryption key storing unit (125) respectively based on the version of the compliance requirements of the client computer (101) and the user information, and sends them to the client computer (101).

Based on the update of the compliance requirements, the encryption key-decryption key creating unit (123) creates a new encryption key corresponding to the updated compliance requirements and a decryption key corresponding to the encryption key.

The compliance requirements storing unit (server side) (124) stores the compliance requirements that each client computer (101) should comply with while managing the compliance requirements with the version of the compliance requirements.

The encryption key-decryption key storing unit (125) stores the encryption key ID (112), the version of the compliance requirements, and the encryption key and the decryption key corresponding to one another.

The access authority storing unit (126) stores the access authority for each user who can use the client computer (101). For that purpose, the user of the client computer (101) needs to register with the server computer (121) that the user is granted the access authority. Based on the registration, the server computer (121) can administer the user of the client computer (101).

FIG. 1C shows an example of contents included in the respective components of the client computer (101) and the server computer (121) of embodiments of the present invention.

The compliance requirements storing unit (client side) (104), the encryption key storing unit (105), the decryption key storing unit (106), and the encryption object storing unit (107) of the client computer (101) store the contents below respectively.

The compliance requirements storing unit (client side) (104) stores the version of the compliance requirements and the compliance requirements associated with the version of the compliance requirements. The version of the compliance requirements and the compliance requirements are available from the compliance requirements storing unit (server side) (124) of the server computer (121).

The encryption key storing unit (105) stores an encryption key ID and an encryption key corresponding to the encryption key ID as one record. The encryption key may be a secret key in secret-key cryptography or a private key in public-key cryptography. The encryption key ID and the encryption key are available from the encryption key-decryption key storing unit (125) of the server computer (121).

The decryption key storing unit (106) stores an encryption key ID and a decryption key corresponding to the encryption key ID as one record. The decryption key may be a secret key in secret-key cryptography or a public key in public-key cryptography. The encryption key and the decryption key that correspond to the same encryption key ID make a pair of keys. The encryption key ID and the decryption key are available from the encryption key-decryption key storing unit (125) of the server computer (121).

The encryption object storing unit (107) stores information on the file that is to be a secret file. Whether the file is to be a secret file or not is defined in the compliance requirements or known by whether the encryption object information is directly input to the client computer (101) or not.

The compliance requirements storing unit (server side) (124) of the server computer (121), the encryption key-decryption key storing unit (125), and the access authority storing unit (126) store the contents below.

The compliance requirements storing unit (server side) (124) stores the version of the compliance requirements and the compliance requirements associated with the version of the compliance requirements. In response to a request from the client computer (101), the version of the compliance requirements and the compliance requirements are sent to the client computer (101).

The encryption key-decryption key storing unit (125) stores an encryption key ID, an encryption key corresponding to the encryption key ID, a decryption key corresponding to the encryption key ID, and the version of the compliance requirements as one record. In response to a request from the client computer (101), the encryption key ID and the encryption key, or the encryption key ID and the decryption key are sent to the client computer (101).

The access authority storing unit (126) stores user information of the client computer (101) and whether the user is authorized to access or not.

Figure 1D:
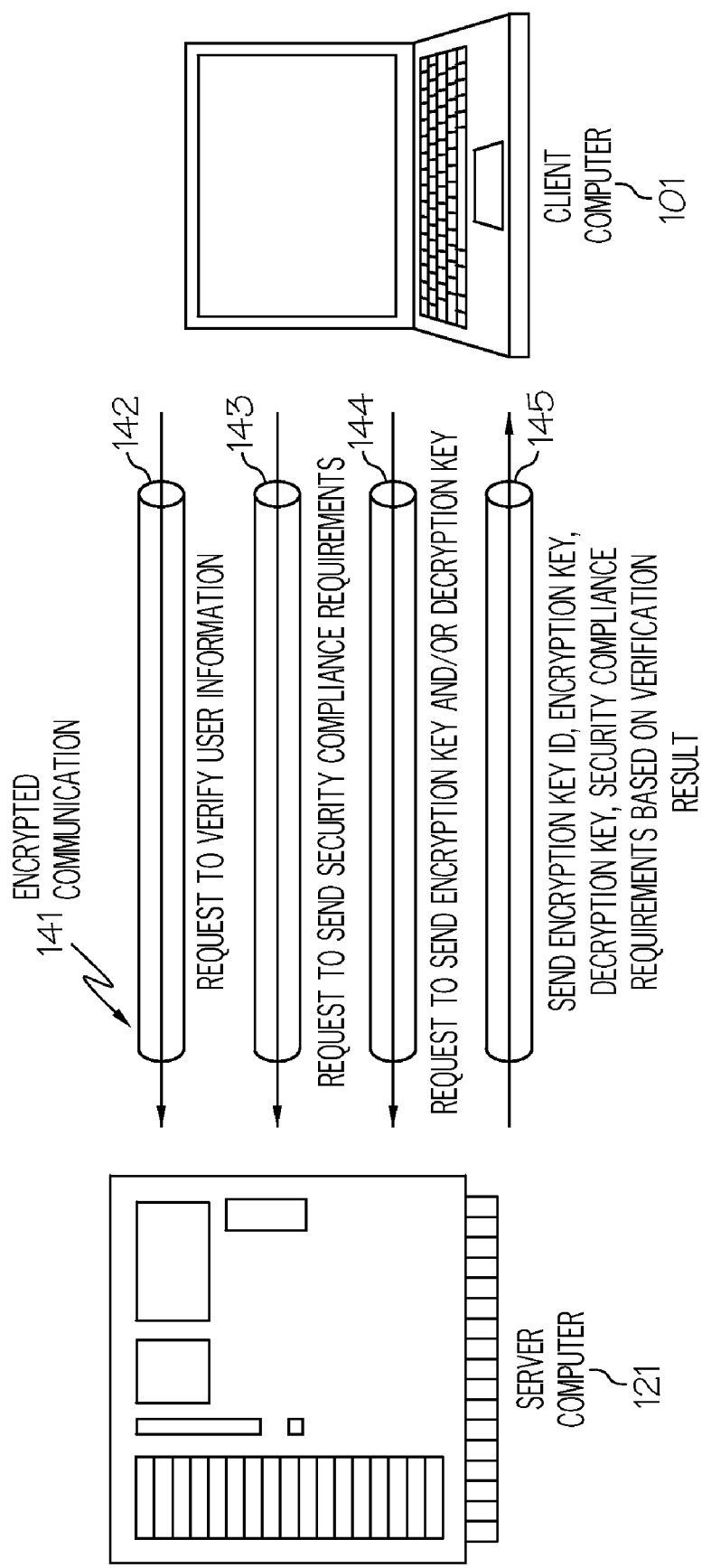
FIG. 1D shows a data flow between the client computer (101) and the server computer (121) of embodiments of the present invention.

FIG. 1D shows a data flow between the client computer (101) and the server computer (121) of embodiments of the present invention.

The communication between the client computer (101) and the server computer (121) is encrypted (141). The encrypted communication method may be SSL, Open SSH, and the like. The client computer (101) sends a request to verify user information (142), a request to send security compliance requirements (143), a request to send encryption key and/or decryption key (144) to the server computer (121).

The server computer (121) sends the encryption key ID, the encryption key, the decryption key, and the security compliance requirements to the client computer (101) based on the verification result of the user information (145). The server computer (121) can send both of the encryption key and the decryption key to the client computer (101) via SSL encrypted communication.

FIG. 2A shows an operation flowchart of file encryption and file writing by the encryption-decryption unit (103) of an embodiment of the present invention.

At step 201, in response to occurrence of a writing event of the general application (111), the encryption-decryption unit (103) hooks the write command.

At step 202, the encryption-decryption unit (103) obtains information on the writing object file. The information on the file includes: whether the file is in the removable device or not; whether the file is in an encryption specified folder; whether the file name includes a predetermined character string or not; and whether the content of the file includes a predetermined character string or not, for example. The predetermined character string is characters indicating that it is classified, such as "encryption", "classified", "confidential". The removable device is an external hard disk, various memory cards, and a memory recording medium.

At step 203, the encryption-decryption unit (103) sends the above-described obtained file information to the security requirements monitoring unit (102).

At step 204, the security requirements monitoring unit (102) determines whether the writing object file is classified or not by comparing the file information sent from the encryption-decryption unit (103) and the information stored in the encryption object storing unit (107). The security requirements monitoring unit (102) sends the determination result of whether the writing object file is classified or not to the encryption-decryption unit (103). The determination result may be sent as whether the file type is classified or general. If the writing object file is not a classified file, i.e., if the writing object file is a general file (114), the security requirements monitoring unit (102) sends a notice of being a general file such as the file type (general) to the encryption-decryption unit (103). The encryption-decryption unit (103) receives the file type (general) and advances the processing to step 205. When the writing object file is classified, the processing proceeds to step 206.

At step 205, since the above-described file is general, the encryption-decryption unit (103) writes the file to the storing unit without encrypting the file (general writing).

At step 206, since the above-described file is classified, the security requirements monitoring unit (102) checks whether the encryption key for encrypting the classified file is in the encryption key storing unit (105) or not. When the encryption key is in the encryption key storing unit (105), the security requirements monitoring unit (102) passes the encryption key to the encryption-decryption unit (103). When the encryption-decryption unit (103) receives the encryption key, the encryption-decryption unit (103) advances the processing to step 208. When the encryption key is not in the encryption key storing unit (105), the security requirements monitoring unit (102) notifies the encryption-decryption unit (103) that the encryption key is unavailable. The encryption-decryption unit (103) receives the notification and advances the processing to step 207.

At step 207, since the encryption key is not stored in the encryption key storing unit (105), the encryption-decryption unit (103) requests the user to establish network connection with the server computer (121). When the network connection is established with the server computer (121), the encryption-decryption unit (103) sends a request to send the encryption key to the server computer (121) (see verification processing of the user information shown in FIG. 6A and FIG. 6B). Requesting the user to establish network connection includes requesting the user to move onto an environment in which network connection can be established with the server computer (121), for example. Alternatively, the encryption-decryption unit (103) requesting the user to deal with the matter. Dealing by the user may be encrypting the file by the user, for example.

At step 208, the encryption-decryption unit (103) encrypts the file with the encryption key from the encryption key storing unit (105) and writes the encrypted file to the storing unit.

At step 209, the encryption-decryption unit (103) embeds the encryption key ID corresponding to the encryption key that is used in the above-described encryption in the encrypted file. The encryption key ID is obtained from the encryption key storing unit (105).

At step 210, in response to the termination of the processing at steps 205, 207, and 209, the writing event processing of the general application ends.

FIG. 2B shows an operation flowchart of file decryption and file reading by the encryption-decryption unit (103) of the embodiment of the present invention.

At step 211, in response to occurrence of a reading event of the general application (111), the encryption-decryption unit (103) hooks the reading command.

At step 212, the encryption-decryption unit (103) obtains information on the reading object file. Then, the encryption-decryption unit (103) checks whether the reading object file is encrypted or not. Whether the file is encrypted or not is checked based on determination on whether the extension to the file is an extension to an encrypted file or an extension to a general application, for example. If the reading object file is not encrypted, the processing proceeds to step 213. When the reading object file is encrypted, the processing proceeds to step 214.

At step 213, since the reading object file is not encrypted, the encryption-decryption unit (103) provides the file to the general application as usual. The general application reads the provided file as it is.

At step 214, since the reading object file is encrypted, the encryption-decryption unit (103) obtains the encryption key ID from the reading object file.

At step 215, the encryption-decryption unit (103) sends the obtained encryption key ID to the security requirements monitoring unit (102).

At step 216, the security requirements monitoring unit (102) searches the decryption key storing unit (106) for the decryption key corresponding to the encryption key ID from the encryption-decryption unit (103). The searching is performed by means of a query or the like using the encryption key ID. When the security requirements monitoring unit (102) finds a record that has the above-described encryption key ID, the security requirements monitoring unit (102) can determine that a decryption key in the record is the searched decryption key. If the decryption key is not in the decryption key storing unit (106), the security requirements monitoring unit (102) passes notification to the encryption-decryption unit (103) that the decryption key cannot be read. The encryption-decryption unit (103) advances the processing to step 217. Alternatively, if the decryption key is not in the decryption key storing unit (106), the security requirements monitoring unit (102) sends the user information and the encryption key ID to the server computer (121). When the security requirements monitoring unit (102) can accordingly obtain the decryption key from the server computer (121), the security requirements monitoring unit (102) records the obtained decryption key and the encryption key ID in the decryption key storing unit (106) as a record. The security requirements monitoring unit (102) further passes the obtained decryption key to the encryption-decryption unit (103). The encryption-decryption unit (103) advances the processing to step 218. When the decryption key is in the decryption key storing unit (106), the security requirements monitoring unit (102) passes notification that the decryption key can be read to the encryption-decryption unit (103). The encryption-decryption unit (103) advances the processing to step 218.

At step 217, since the decryption key is not in the decryption key storing unit (106), the encryption-decryption unit (103) notifies the general application (111) that the file cannot be read.

At step 218, since the decryption key is in the decryption key storing unit (106), the security requirements monitoring unit (102) sends the decryption key from the decryption key storing unit (106) to the encryption-decryption unit (103).

At step 219, the encryption-decryption unit (103) decrypts the encrypted file with the decryption key from the decryption key storing unit (106) and writes the decrypted file to the storing unit. The general application reads the decrypted file.

At step 220, in response to the termination of the processing at steps 213, 217, and 219, the writing event of the general application ends.

FIG. 3A shows an operation flowchart of the security requirements monitoring unit (102) of an embodiment of the present invention.

At step 301, the security requirements monitoring unit (102) starts when the operating system of the client computer (101) starts.

At step 302, the security requirements monitoring unit (102) prompts the user to input user information for logging in to the client computer (101), which is according to the embodiment of the present invention. The user information is managed in the access authority storing unit (126) of the server computer. Input of the user information is merely prompted at step 302, while whether the user is authorized to access or not is checked at step 314.

At step 303, the security requirements monitoring unit (102) checks whether the compliance requirements are stored in the compliance requirements storing unit (104) or not. If the compliance requirements are not stored in the compliance requirements storing unit (104), the processing proceeds to step 304. When the compliance requirements are stored in the compliance requirements storing unit (104), the processing proceeds to step 305.

At step 304, the security requirements monitoring unit (102) deletes the encryption key in the encryption key storing unit (105) and the decryption key in the decryption key storing unit (106).

At step 305, the security requirements monitoring unit (102) reads the compliance requirements from the compliance requirements storing unit (104).

At step 306, the security requirements monitoring unit (102) checks whether the client computer (101) complies with the compliance requirements or not. When the compliance requirements are complied with, the processing proceeds to step 307. If the compliance requirements are not complied with, the processing proceeds to step 304.

At step 307, the security requirements monitoring unit (102) checks whether the client computer (101) is connected to the network or not, i.e., whether the client computer (101) is online or not. If the client computer (101) is not online, the processing proceeds to step 308. When the client computer (101) is online, the processing proceeds to step 309.

At step 308, in the case in which the encryption key storing unit (105) and the decryption key storing unit (106) are locked, the security requirements monitoring unit (102) unlocks the units. The case in which the units are locked results from that the units are locked at step 313 and the processing loops to step 308.

At step 310, the security requirements monitoring unit (102) sets 0 to the variable Online (meaning offline) and 0 to the variable Reachable (meaning that the server computer is not reached) respectively and advances the processing to step 311.

At step 311, the security requirements monitoring unit (102) executes file operation processing shown in FIG. 3B. The details of the file processing depend on the respective values of the variable Online and the variable Reachable and conditional sentences at the steps shown in FIG. 3B.

At step 312, the security requirements monitoring unit (102) checks whether the file operation processing shown in FIG. 3B has normally terminated or not. When the processing has normally terminated, the processing returns to step 305. If the processing has not normally terminated, the processing returns to step 304.

At step 309, the security requirements monitoring unit (102) checks whether the server computer (121) can connect to the client computer (101) or not. If the server computer (121) cannot connect to the client computer (101), the processing proceeds to step 313. When the server computer (121) can connect to the client computer (101), the processing proceeds to step 314.

At step 313, since the client computer (101) cannot connect to the server computer (121), the security requirements monitoring unit (102) locks the encryption key storing unit (105) and the decryption key storing unit (106). The units are locked in the case in which step 307 is Yes (i.e., the client computer (101) is online (can connect to the network)) and step 309 is No (i.e., the server is not reachable (the client computer cannot communicate with the server)).

At step 315, the security requirements monitoring unit (102) sets 1 to the variable Online (meaning online) and 0 to Reachable (meaning that the server computer is not reached) respectively and advances the processing to step 316.

At step 316, the security requirements monitoring unit (102) executes file operation processing shown in FIG. 3B. The details of the file processing depend on the respective values of the variable Online and the variable Reachable and the conditional sentences at the steps shown in FIG. 3B.

At step 317, the security requirements monitoring unit (102) checks whether the file operation processing shown in FIG. 3B has normally terminated or not. If the processing has normally terminated, the processing returns to step 305. If the processing has not normally terminated, the processing returns to step 304.

At step 314, the security requirements monitoring unit (102) sends a request to verify access authority of the logged-in user by using the user information obtained at step 302 to the server computer (121). When the information on the access authority is returned from the server computer (121), the security requirements monitoring unit (102) advances the processing to step 318.

At step 318, when the security requirements monitoring unit (102) receives a response indicating that the user is authorized to access from the server computer (121), the security requirements monitoring unit (102) advances the processing to step 319. If the security requirements monitoring unit (102) receives a response indicating that the user is not authorized to access from the server computer (121), the security requirements monitoring unit (102) returns the processing to step 304.

At step 319, the security requirements monitoring unit (102) receives the information on whether the version of the compliance requirements sent from the client computer (101) matches the latest version of the compliance requirements stored in the compliance requirements storing unit (124) of the server computer (121) from the security verifying unit (122) of the server computer (121). If the above-described versions of the compliance requirements do not match, the processing proceeds to step 320. When the above-described versions of the compliance requirements match, the processing proceeds to step 322. The processing does not proceed from step 319 to step 322 until the above-described versions of the compliance requirements match.

At step 320, since the above-described versions of the compliance requirements do not match, the client computer (101) requests the server computer (121) to send the latest compliance requirements.

At step 321, the security requirements monitoring unit (102) overwrites the compliance requirements stored in the compliance requirements storing unit (104) and the version thereof with the latest compliance requirements stored in the compliance requirements storing unit of the server computer (121) and the latest version of the compliance requirements. The compliance requirements storing unit (104) of the client side is updated by the overwriting. After the overwriting, the processing returns to step 305.

At step 322, since the above-described versions of the compliance requirements match, the security requirements monitoring unit (102) unlocks the encryption key storing unit (105) and the decryption key storing unit (106) in the case in which the units are locked. The case in which the units are locked results from that the units are locked at step 313 and the processing loops to step 322.

At step 323, the security requirements monitoring unit (102) scans the decryption key storing unit (106) by using the encryption key ID.

At step 324, if the decryption key corresponding to the encryption key ID is not in the decryption key storing unit (106), the processing proceeds to step 325. When the decryption key corresponding to the encryption key ID is in the decryption key storing unit (106), the processing proceeds to step 327.

At step 325, since the decryption key is not in the decryption key storing unit (106), the security requirements monitoring unit (102) overwrites the encryption key storing unit (105) with the encryption key ID and the encryption key corresponding to the encryption key ID. Then, the processing proceeds to step 326.

At step 326, the security requirements monitoring unit (102) adds the encryption key ID and the decryption key corresponding to the encryption key ID to the decryption key storing unit (106).

At step 327, the security requirements monitoring unit (102) sets 1 to the variable Online (meaning online) and 1 to the variable Reachable (meaning that the server computer is reached) and advances the processing to step 316.

At step 328, if the client computer (101) is not online, the processing proceeds to step 329. When the client computer (101) is online, the processing proceeds to step 330.

At step 329, since the client computer (101) is not online, the security requirements monitoring unit (102) sets 0 to the variable Online (meaning not online) and 0 to the variable Reachable (meaning that the server computer is not reached) and advances the processing to step 332.

At step 332, the security requirements monitoring unit (102) executes the file operation processing shown in FIG. 3B. The details of the file processing depend on the respective values of the variable Online and the variable Reachable and the conditional sentences at the steps shown in FIG. 3B.

At step 330, the security requirements monitoring unit (102) checks whether the client computer (101) can connect to the server computer (121) or not. If the client computer (101) cannot connect to the server computer (121), the processing proceeds to step 331. When the client computer (101) can connect to the server computer (121), the processing proceeds to step 320.

At step 331, the security requirements monitoring unit (102) sets 1 to the variable Online (meaning online) and 0 to the variable Reachable (meaning that the server computer is not reached) and advances the processing to step 332.

At step 332, the security requirements monitoring unit (102) executes the file operation processing shown in FIG. 3B. The details of the file processing depend on the respective values of the variable Online and the variable Reachable and the conditional sentences at the steps shown in FIG. 3B.

FIG. 3B shows an operation flowchart of file operation by the security requirements monitoring unit (102) of an embodiment of the present invention.

Step 341 is started when the subroutine of the file operation processing is called at steps 311, 316, and 332 shown in FIG. 3A.

At step 342, the security requirements monitoring unit (102) checks whether a read request is issued from the encryption-decryption unit (103) or not. If the read request is issued, the processing proceeds to step 344. When the read request is not issued, the processing proceeds to step 343.

At step 344, since a file read request is issued from the encryption-decryption unit (103), the security requirements monitoring unit (102) calls the subroutine of the file read processing shown in FIG. 3C.

At step 345, the security requirements monitoring unit (102) determines whether the file read processing has normally terminated or not. When the processing has normally terminated, the processing proceeds to step 348. If the processing has not normally terminated, the processing proceeds to step 346.

At step 346, in response to the result at step 345, abnormal termination is returned as a return value of the subroutine.

At step 343, the security requirements monitoring unit (102) checks whether a write request is issued from the encryption-decryption unit (103) or not. If the write request is issued, the processing proceeds to step 347. When the write request is not issued, the processing proceeds to step 348.

At step 347, since a file write request is issued from the encryption-decryption unit (103), the security requirements monitoring unit (102) calls the subroutine of the file write processing shown in FIG. 3D. After the subroutine of the write processing terminated, the processing proceeds to step 348.

At step 348, the security requirements monitoring unit (102) obtains status information from the security software (108).

At step 349, the security requirements monitoring unit (102) checks the status information from the security software (108) whether a threat is detected or not. If a threat is detected, the processing proceeds to step 346. If a threat is not detected, the processing proceeds to step 350.

At step 346, in response to the result at step 349, abnormal termination is returned as a return value of the subroutine. The return value is used in determination on whether the processing at steps 312 and 317 shown in FIG. 3A has normally terminated or not.

At step 350, the security requirements monitoring unit (102) checks whether the variable Online is 0 and the client computer (101) is currently online or not. The variable Online is set at steps 310, 327, 329, and 331 shown in FIG. 3A. That 0 is set to the variable Online indicates that "the client computer had not been online" before the subroutine of the file operation processing started. That means when the value of the variable Online is checked, and if the value is 0, Yes is returned, and if the value is not 0, No is returned. As for the determination equation "variable Online==0", if the variable Online is 0, Yes is returned. If the variable Online is 0 and the client computer (101) is currently online, the processing proceeds to step 351. When the variable Online is 0 and the client computer (101) is not currently online, the processing proceeds to step 352.

At step 351, since the variable Online is 0 and the client computer (101) is currently online, the security requirements monitoring unit (102) locks the encryption key storing unit (105) and the decryption key storing unit (106).

At step 352, the security requirements monitoring unit (102) checks whether the variable Reachable is 0 and the server is currently reached or not. The variable Reachable is set at steps 310, 327, 329, and 331 shown in FIG. 3A. That 0 is set to the variable Reachable indicates that "the server was not be able to be reached" before the subroutine of the file operation processing started. That means when the value of the variable Reachable is checked, and if the value is 0, Yes is returned, and if the value is not 0, No is returned. As for the determination equation "variable Reachable==0", if the variable Reachable is 0, Yes is returned. If the variable Reachable is 0 and the server is currently reached, the processing proceeds to step 354. If the variable Reachable is 0 and the server is not currently reached, the processing proceeds to step 353.

At step 353, the security requirements monitoring unit (102) checks whether a defined time has expired or not. Any time period that a system administrator thinks appropriate can be set to the defined time. Where the client computer can reach the server computer, the value of the defined time is the longest value for the time period during which the server computer is not requested to verify the user information. When the defined time has expired, the operation proceeds to step 354. On the other hand, if the defined time has not expired, the operation returns to step 342.

At step 354, in response to the termination of the processing at step 351, 352, or 353, normal termination is returned as a return value of the subroutine. The return value is used in determination on whether the processing at steps 312 and 317 shown in FIG. 3A has normally terminated or not.

FIG. 3C shows an operation flowchart of read processing of a sensitive file encrypted by the security requirements monitoring unit (102), which is an embodiment of the present invention.

Step 361 is started when the subroutine of the file read operation processing is called at step 344 shown in FIG. 3B.

At step 362, the security requirements monitoring unit (102) receives the encryption key ID embedded in the reading object file for searching the encryption-decryption unit (103) for the decryption key.

At step 363, the security requirements monitoring unit (102) checks whether the decryption key storing unit (106) is locked or not. If the decryption key storing unit (106) is locked, the processing proceeds to step 364. When the decryption key storing unit (106) is not locked, the processing proceeds to step 365.

At step 364, since the decryption key storing unit (106) is locked, the security requirements monitoring unit (102) notifies the encryption-decryption unit (103) that the encrypted sensitive file cannot be read.

At step 365, since the decryption key storing unit (106) is not locked, the security requirements monitoring unit (102) scans the decryption key storing unit (106) for the decryption key by means of a query using the encryption key ID.

At step 366, if the decryption key is obtained, the processing proceeds to step 373. When the decryption key is not obtained, the processing proceeds to step 367.

At step 367, the security requirements monitoring unit (102) checks whether the variable Reachable is 1 or not. The variable Reachable is set at steps 310, 327, 329, and 331 shown in FIG. 3A. That 1 is set to the variable Reachable indicates that "the server can be reached" before the subroutine of the file operation processing started. That means when the value of the variable Reachable is checked, and if the value is 1, Yes is returned, and if the value is not 1, No is returned. As for the determination equation "variable Reachable==1", if the variable Reachable is 1, Yes is returned. If the variable Reachable is not 1, the processing proceeds to step 364. When the variable Reachable is 1, the processing proceeds to step 368.

At step 368, the security requirements monitoring unit (102) requests the decryption key from the server computer (121). The security requirements monitoring unit (102) sends the user information and the encryption key ID of the client computer (101) to the server computer (121) for the requirements.

At step 369, the security requirements monitoring unit (102) requests the server computer (121) to verify whether the user of the client computer (101) is authorized or not. If the user is not authorized, the processing proceeds to step 370. When the user is authorized, the processing proceeds to step 372.

At step 370, since the user is not authorized, the security requirements monitoring unit (102) notifies the encryption-decryption unit (103) that the file cannot be read.

At step 371, in response to the result at step 370, abnormal termination is returned as a return value of the subroutine. The return value is used in determination on whether the processing at step 345 shown in FIG. 3B has normally terminated or not.

At step 372, since the user is authorized, the security requirements monitoring unit (102) adds the encryption key ID and the decryption key received from the server computer (121) to the decryption key storing unit (106) as a record.

At step 373, the security requirements monitoring unit (102) passes notification that the encrypted sensitive file can be read and the decryption key to the encryption-decryption unit (103).

At step 374, in response to the termination of the processing at step 364 or 373, normal termination is returned as a return value of the subroutine. The return value is used in determination on whether the processing at step 345 shown in FIG. 3B has normally terminated or not.

FIG. 3D shows an operation flowchart of file write processing by the security requirements monitoring unit (102), which is an embodiment of the present invention.

Step 381 is started when the subroutine of the file write processing is called at step 347 shown in FIG. 3B. At step 382, the security requirements monitoring unit (102) obtains information on the writing object file from the encryption-decryption unit (103).

At step 383, the security requirements monitoring unit (102) scans the encryption object storing unit (107) by using the obtained file information and obtains information on the writing object file.

At step 384, the security requirements monitoring unit (102) determines whether the writing object file is classified or general by comparing the file information sent from the encryption-decryption unit (103) and the information obtained from the encryption object storing unit (107). If the file is not classified, the processing proceeds to step 385. When the file is classified, the processing proceeds to step 386.

At step 385, the security requirements monitoring unit (102) notifies the encryption-decryption unit (103) that the file is not classified or that the file is a general file.

At step 386, when the file is classified, the security requirements monitoring unit (102) checks whether the encryption key storing unit (105) is locked or not. If the encryption key storing unit (105) is locked, the processing proceeds to step 387. When the encryption key storing unit (105) is not locked, the processing proceeds to step 388.

At step 387, since the encryption key storing unit (105) is locked, the security requirements monitoring unit (102) notifies the encryption-decryption unit (103) that the sensitive file and the encryption key for writing the sensitive file cannot be provided. The processing proceeds to step 387 when the client computer (101) is offline or when the client computer (101) is online and the server computer (121) is not reached. Therefore, the encryption key cannot be provided in either case.

At step 389, the security requirements monitoring unit (102) obtains the encryption key ID and the encryption key from the encryption key storing unit (105).

At step 390, the security requirements monitoring unit (102) notifies the encryption-decryption unit (103) that the object is a classified file and that the encryption key for writing the sensitive file can be provided, and passes the encryption key ID and the above-described encryption key.

At step 391, in response to the termination of the processing at step 385, 387, or 390, normal termination is returned as a return value of the subroutine. As the result, step 347 shown in FIG. 3B terminates and the processing proceeds to step 348.

Figure 4A:
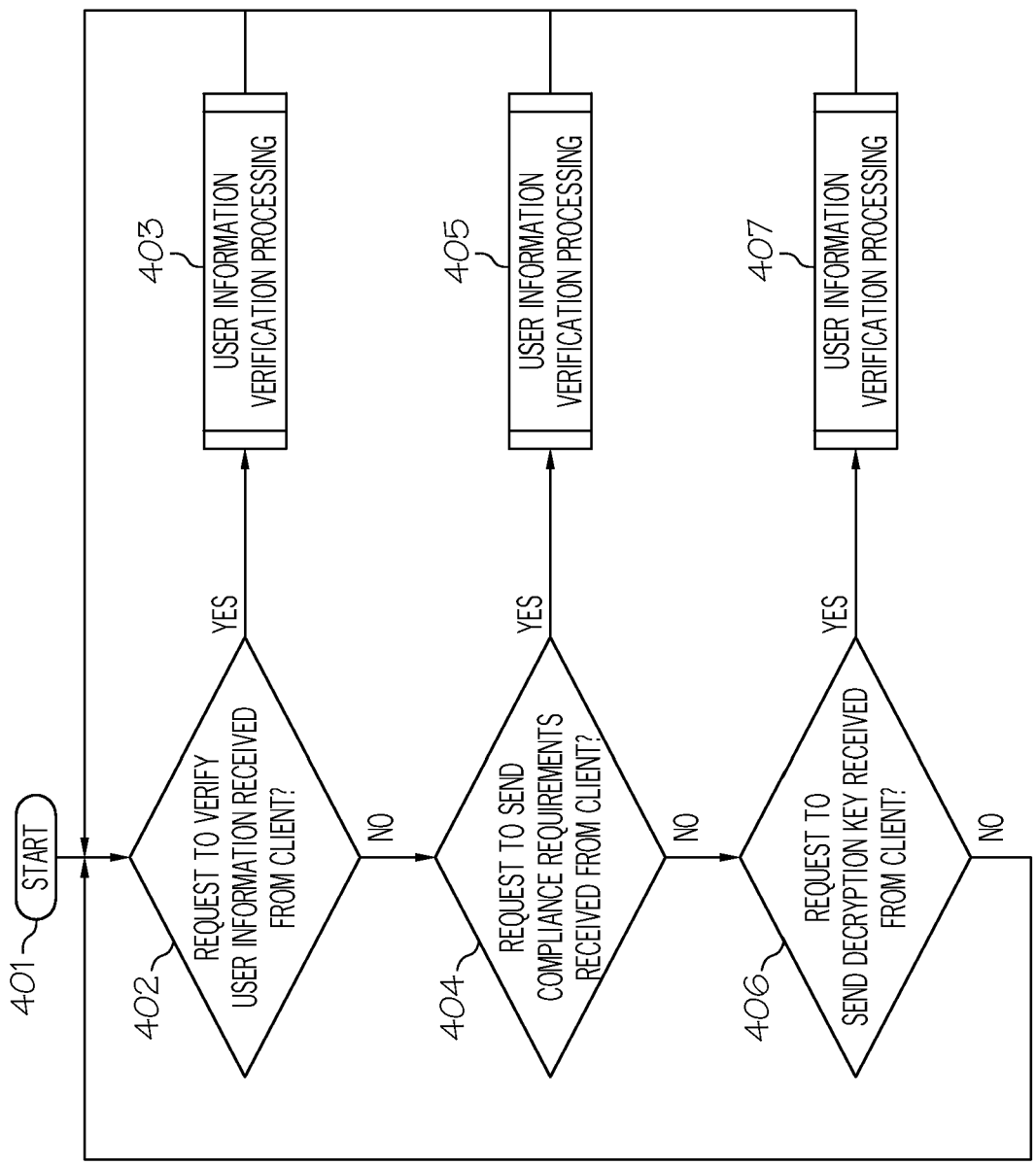
FIG. 4A shows an operation flowchart of a security verifying unit (122) of an embodiment of the present invention.

FIG. 4A shows an operation flowchart of the security verifying unit (122) of an embodiment of the present invention.

At step 401, the security verifying unit (122) starts when the operating system of the server computer (121) starts.

At step 402, the security verifying unit (122) checks whether a request to verify the user information is received from the client computer (101) or not. If the verify request is received, the processing proceeds to step 403. When the verify request is not received, the processing proceeds to step 404.

At step 403, since the verify request is received, the security verifying unit (122) executes the verify processing on the user information. The security verifying unit (122) executes the verify processing on the user information by calling the subroutine shown in FIG. 4B.

At step 404, the security verifying unit (122) checks whether a request to send the compliance requirements is received from the client computer (101) or not. If the request to send the compliance requirements is received, the processing proceeds to step 405. When the request to send the compliance requirements is not received, the processing proceeds to step 406.

At step 405, since the send request is received, the security verifying unit (122) executes the compliance requirements send request processing. The security verifying unit (122) executes the compliance requirements send request processing by calling the subroutine shown in FIG. 4C.

At step 406, the security verifying unit (122) checks whether a request to send the decryption key is received from the client computer (101) or not. If the request to send the decryption key is received, the processing proceeds to step 407. When the request to send the decryption key is not received, the processing returns to step 402.

At step 407, since the request to send the decryption key is received, the security verifying unit (122) executes the decryption key send request processing. The security verifying unit (122) executes the decryption key send request processing by calling the subroutine shown in FIG. 4D.

FIG. 4B shows an operation flowchart of verify processing on the user information in the security verifying unit (122), which is an embodiment of the present invention.

Step 411 is started when the subroutine of the verify processing on the user information is called at step 403 shown in FIG. 4A.

At step 412, the security verifying unit (122) receives the user information and the version of the compliance requirements from the client computer (101).

At step 413, the security verifying unit (122) obtains the access authority information by executing a query on the access authority storing unit (126) by using the received user information.

At step 414, the security verifying unit (122) determines whether the user of the client computer (101) is authorized or not. If the user is not authorized, the processing proceeds to step 415. When the user is authorized, the processing proceeds to step 416.

At step 415, since the user of the client computer (101) is not authorized, the security verifying unit (122) notifies the client computer (101) that the user is not authorized to access.

At step 416, since the user of the client computer (101) is authorized, the security verifying unit (122) obtains the latest version of the compliance requirements from the compliance requirements storing unit at the server side (124).

At step 417, the security verifying unit (122) checks whether the version of the compliance requirements sent from the client computer (101) matches the above-described latest version of the compliance requirements or not. If the above-described versions do not match, the processing proceeds to step 418. When the above-described versions match, the processing proceeds to step 419.

At step 418, since the above-described versions do not match, the security verifying unit (122) notifies the client computer (101) that the user is authorized to access but the versions of the compliance requirements do not match. Since the versions of the compliance requirements do not match at step 418, the encryption key ID, the encryption key, and the decryption key are not passed to the client computer (101).

At step 419, the security verifying unit (122) executes a query on the encryption key-decryption key storing unit (125) by using the version of the compliance requirements. Then, the security verifying unit (122) obtains the encryption key ID, the encryption key, and the decryption key corresponding to the version of the compliance requirements.

At step 420, since the above-described versions match, the security verifying unit (122) notifies the client computer (101) that the user is authorized to access and that the version of the compliance requirements sent from the client computer (101) and the latest version of the compliance requirements stored in the compliance requirements storing unit (124) of the server computer (121) match, and passes the above-described obtained encryption key ID, the encryption key, and the decryption key to the client computer (101).

At step 421, in response to the termination of the processing at step 415, 418, or 420, the security verifying unit (122) terminates the verify processing on the user information. Then, the processing returns to step 402 shown in FIG. 4A.

FIG. 4C shows an operation flowchart of compliance requirements send request processing in the security verifying unit (122), which is an embodiment of the present invention.

Step 431 is started when the subroutine of the compliance requirements send request processing is called at step 405 shown in FIG. 4A.

At step 432, the security verifying unit (122) extracts the latest version of the compliance requirements and the compliance requirements corresponding to the version from the compliance requirements storing unit (124) of the server computer (121).

At step 433, the security verifying unit (122) passes the extracted versions of the compliance requirements and the compliance requirements to the client computer (101).

At step 434, in response to the termination of the processing at step 433, the security verifying unit (122) terminates the subroutine of the compliance requirements send request processing. Then, the processing returns to step 402 shown in FIG. 4A.

FIG. 4D shows an operation flowchart of decryption key send request processing in the security verifying unit (122), which is an embodiment of the present invention.

Step 441 is started when the subroutine of the decryption key send request processing is called at step 407 shown in FIG. 4A.

At step 442, the security verifying unit (122) receives the user information and the encryption key ID from the client computer (101).

At step 443, the security verifying unit (122) obtains the access authority information by executing a query on the access authority storing unit (126) by using the received user information.

At step 444, the security verifying unit (122) determines whether the user of the client computer (101) is authorized or not. If the user is not authorized, the processing proceeds to step 445. When the user is authorized, the processing proceeds to step 446.

At step 445, since the user of the client computer (101) is not authorized, the security verifying unit (122) notifies the client computer (101) that the user is not authorized to access.

At step 446, since the user of the client computer (101) is authorized, the security verifying unit (122) executes a query on the encryption key-decryption key storing unit (125) by using the encryption key ID. As the result, the security verifying unit (122) obtains the decryption key corresponding to the encryption key ID.

At step 447, since the user of the client computer (101) is authorized, the security verifying unit (122) notifies the client computer (101) that the user is authorized to access, and passes the above-described obtained decryption key to the client computer (101).

At step 448, in response to the termination of the processing at step 445 or 447, the security verifying unit (122) terminates the subroutine of the user information verify processing. Then, the processing returns to step 402 shown in FIG. 4A.

FIG. 5 shows an operation flowchart at occurrence of an event of adding compliance requirements in the encryption key-decryption key creating unit (123) of an embodiment of the present invention.

At step 501, the encryption key-decryption key creating unit (123) recognizes that the compliance requirements have been updated and that the event of adding compliance requirements to the compliance requirements storing unit (124) at the server side has occurred.

At step 502, the encryption key-decryption key creating unit (123) decides the encryption key ID.

At step 503, the encryption key-decryption key creating unit (123) obtains the latest version of the compliance requirements from the compliance requirements storing unit (124) at the server side.

At step 504, the encryption key-decryption key creating unit (123) creates the encryption key corresponding to the above-described encryption key ID.

At step 505, the encryption key-decryption key creating unit (123) creates the decryption key that corresponds to the above-described encryption key ID and makes a pair with the above-described created encryption key.

At step 506, the encryption key-decryption key creating unit (123) adds the encryption key ID, the encryption key, the decryption key, and the version of the compliance requirements to the encryption key-decryption key storing unit (125) as a record.

At step 507, in response to the termination of the processing at step 506, the encryption key-decryption key creating unit (123) terminates the processing performed at the occurrence of the compliance requirements adding event.

FIG. 6 shows details at data exchange in an embodiment of the present invention.

Each requesting side sends data sent from requesting side to each requested side. In response, each requested side sends data sent from requested side to each requesting side.

Figure 7:
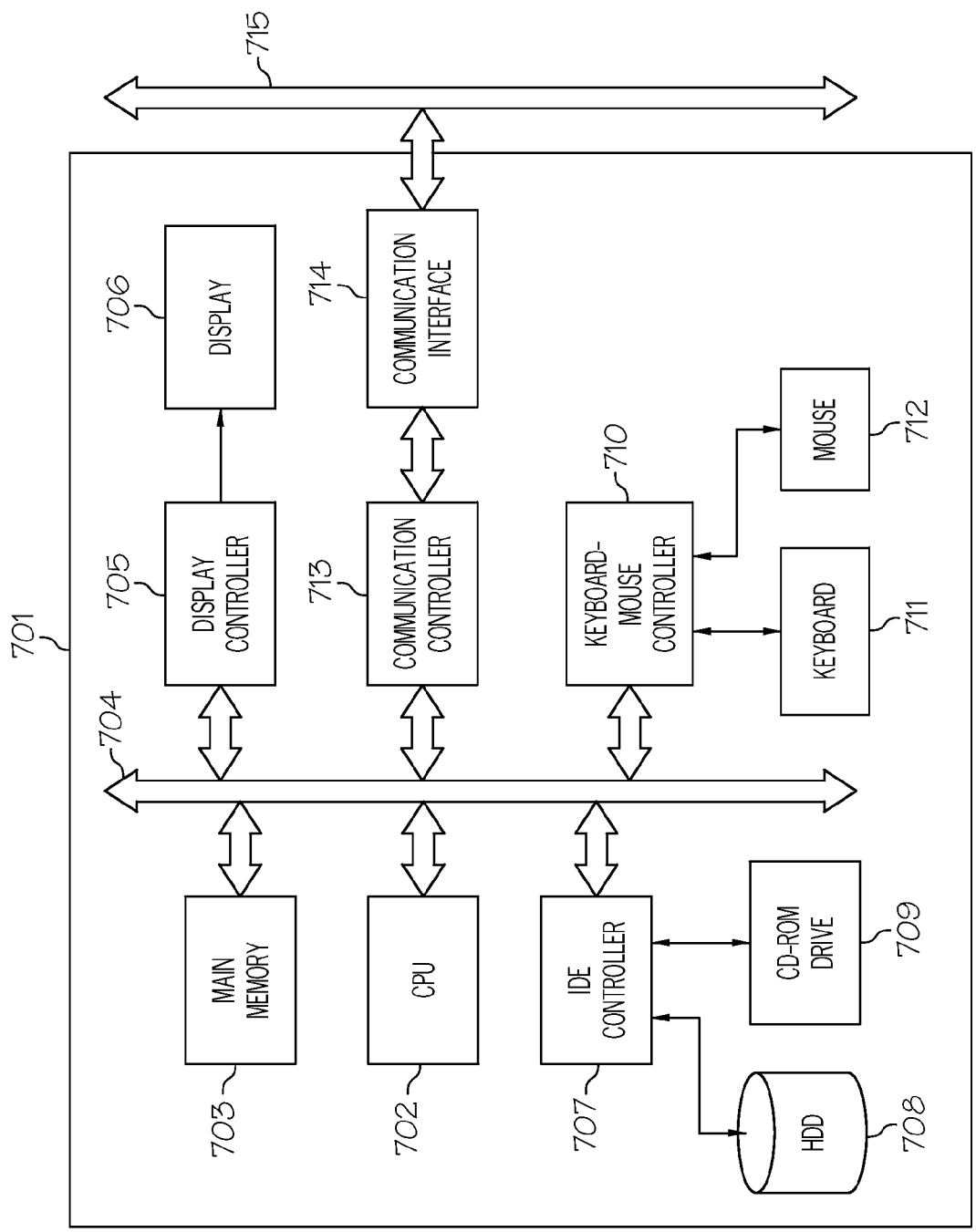
FIG. 7 shows a hardware block diagram of the client computer (101) and the server computer (121) in the embodiments of the present invention.

FIG. 7 shows a hardware block diagram of the client computer (101) and the server computer (121) in the embodiments of the present invention.

The client computer (101) and the server computer (121) according to the example of the present invention (hereinafter, simply referred to as a computer system (701)) include a CPU (702) and a main memory (703), both of which are connected to a bus (704). The CPU (702) is preferably based on an architecture of 32 bits or 64 bits. The CPU (702) may be Xeon (trademark) series, Core (trademark) series, Atom (trademark) series, Pentium (trademark) series, and Celeron (trademark) series from Intel Corporation; Phenom (trademark) series, Athlon (trademark) series, Turion (trademark) series, and Sempron (trademark) series from Advanced Micro Devices Incorporated, or the like. A display (706) such as an LCD monitor is connected to the bus (704) via a display controller (705). The display (706) is used for displaying information on software running in the computer system (701) by means of an appropriate graphic interface. A hard disk or silicon disk (708) and a CD-ROM, DVD, or Blu-ray drive (709) are also connected to the bus (704) via an IDE or SATA controller (707). The CD-ROM, DVD, or BD drive (709) is used for introducing a program product from a CD-ROM, DVD-ROM, or BD to the hard disk or silicon disk (708) as required. A keyboard (711) and a mouse (712) are also connected to the bus (704) via a keyboard-mouse controller (710) or a USB controller (not shown).

A communication interface (714), which complies with the Ethernet (trademark) protocol for example, is connected to the bus (704) via a communication controller (713). The communication interface (714) plays a role of physically connecting the computer system (701) and a communication line (715). The communication interface (714) provides the network interface layer for the TCP/IP communication protocol of the communication function of the operating system of the computer system (701). The communication line may be a wire LAN environment, or a wireless LAN environment based on a wireless LAN connection standard such as IEEE 802.11a/b/g/n.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention has been described according to the embodiments; though, the details described about the embodiments are merely examples of the present invention. It will be understood that those skilled in the art can make various modifications without departing from the technical scope of the present invention.

The invention claimed is:

1. An apparatus for shielding a sensitive file that can connect to a server computer via a network, comprising:

an encryption-decryption unit for encrypting the sensitive file with an encryption key and decrypting the encrypted sensitive file with a decryption key corresponding to the encryption key, wherein an encryption key ID is embedded in the encrypted sensitive file, and the encryption key and the decryption key correspond to the encryption key ID;

an encryption key storing unit for storing the encryption key;

a decryption key storing unit for storing the decryption key;

a compliance requirements storing unit that stores security compliance requirements of the apparatus, wherein the security compliance requirements are sent from the server computer; and a security requirements monitoring unit for determining whether the apparatus complies with the security compliance requirements or not in response to a read instruction or a write instruction of the sensitive file by application software, wherein said security requirements monitoring unit requests the server computer to verify user information of the apparatus and a version of the security compliance requirements, and unlocks said encryption key storing unit and said decryption key storing unit when the user information and the version are successfully verified, wherein when the apparatus complies with the security compliance requirements, said security requirements monitoring unit passes the encryption key and the encryption key ID corresponding to the encryption key from said encryption key storing unit to said encryption-decryption unit in response to the write instruction, or passes the decryption key corresponding to the encryption key ID embedded in the encrypted sensitive file from said decryption key storing unit to said encryption-decryption unit in response to the read instruction.

2. The apparatus according to claim 1, wherein said security requirements monitoring unit communicates with the server computer at a predetermined time, and when the user information is successfully verified on the server computer and the version of the apparatus matches a latest version of the security compliance requirements stored in the server computer, receives the encryption key and the decryption key corresponding to the latest version of the security compliance requirements and the encryption key ID corresponding to the encryption key and the decryption key from the server computer.

3. The apparatus according to claim 1, wherein said security requirements monitoring unit locks said encryption key storing unit and said decryption key storing unit when the apparatus is connected to the network but has not reached the server computer.

4. The apparatus according to claim 3, wherein said security requirements monitoring unit unlocks said encryption key storing unit and said decryption key storing unit when the apparatus is disconnected from the network.

5. The apparatus according to claim 1, wherein said security requirements monitoring unit deletes the encryption key stored in said encryption key storing unit and the decryption key stored in said decryption key storing unit when the apparatus does not comply with the security compliance requirements.

6. The apparatus according to claim 1, wherein said security requirements monitoring unit deletes the encryption key stored in said encryption key storing unit and the decryption key stored in said decryption key storing unit when the security compliance requirements are not stored in said compliance requirements storing unit.

7. The apparatus according to claim 1, wherein said security requirements monitoring unit deletes the encryption key stored in said encryption key storing unit and the decryption key stored in said decryption key storing unit in response to reception of a warning from security software.

8. The apparatus according to claim 1, wherein said security requirements monitoring unit sends an instruction to request the decryption key, the user information, and the encryption key ID corresponding to the decryption key to the server computer when the decryption key is not in said decryption key storing unit, and in response to the reception of the decryption key corresponding to the encryption key ID from the server computer, passes the received decryption key to said encryption-decryption unit.

9. The apparatus according to claim 1, wherein said security requirements monitoring unit notifies said encryption-decryption unit that the encryption key cannot be obtained when the encryption key is not in said encryption key storing unit.

10. The apparatus according to claim 1, wherein said security requirements monitoring unit determines whether the apparatus complies with the security compliance requirements or not by a predetermined cycle.

11. The apparatus according to claim 1, wherein said encryption-decryption unit
obtains the encryption key ID embedded in the sensitive file to be decrypted from the sensitive file;
passes the encryption key ID to said security requirements monitoring unit; and
decrypts the encrypted sensitive file with the decryption key passed from said security requirements monitoring unit.

12. The apparatus according to claim 1, wherein said encryption-decryption unit
encrypts the sensitive file with the encryption key passed from said security requirements monitoring unit; and
embeds the encryption key ID corresponding to the encryption key in the encrypted sensitive file.

13. The apparatus according to claim 1, wherein compliance of the security compliance requirements includes at least one of:
no threat being reported by the security software;
a boot password for the apparatus being set; and
an idle time screen lock being set.

14. A server computer that can connect to the apparatus according to claim 1, comprising:
an access authority storing unit that stores access authority information of a user of the apparatus;
a server side compliance requirements storing unit that stores security compliance requirements to be sent to the apparatus;
an encryption key-decryption key storing unit that stores a record including an encryption key, a decryption key corresponding to the encryption key, an encryption key ID corresponding to the encryption key and the decryption key, and a version of security compliance requirements; and
a security verifying unit that matches user information sent from the apparatus with access authority information stored in said access authority storing unit in response to reception of a request to verify the user information from the apparatus, and if the two kinds of information match, compares the version of the security compliance requirements sent from the apparatus with the latest version that is stored in said security requirements storing unit.

15. The server computer according to claim 14, wherein said encryption key-decryption key creating unit adds a record including the encryption key, the decryption key corresponding to the encryption key, the encryption key ID corresponding to the encryption key and the decryption key, and an updated version of the security compliance requirements to encryption key-decryption key storing unit at each time when the security compliance requirements are updated.

16. The server computer according to claim 14, wherein if the version of the security compliance requirements sent from the apparatus matches the latest version that is stored in said security compliance requirements storing unit,
said security verifying unit
sends the encryption key, the decryption key, the encryption key ID corresponding to the encryption key and the decryption key which correspond to the latest version of the security compliance requirements, and the latest version of the security compliance requirements to the apparatus.

17. The server computer according to claim 14, wherein said security verifying unit matches the user information that is sent with a request to send the decryption key with the access authority that is stored in said access authority storing unit in response to reception of the request from the apparatus, and if the user information matches the access authority, sends the decryption key, and the encryption key ID corresponding to the encryption key and the decryption key to the apparatus.

18. A method for shielding a sensitive file on an apparatus that can connect to a server computer via a network, comprising:
requesting the server computer to verify user information of the apparatus and a version of security compliance requirements,
determining whether the apparatus complies with the security compliance requirements sent from the server computer or not in response to a read instruction or a write instruction of the sensitive file by application software, wherein the security compliance requirements are stored in a compliance requirements storing unit;
when the user information and the version of the security requirements are complied with successfully verified,
in response to the write instruction,
executing
unlocking an encryption key storing unit
encrypting the sensitive file with an encryption key, wherein the encryption key is stored in the encryption key storing unit; and
embedding an encryption key ID corresponding to the encryption key in the encrypted file; or,
in response to the read instruction,
executing
unlocking a decryption key storing unit
decrypting the encrypted sensitive file with a decryption key corresponding to the encryption key ID embedded in the encrypted sensitive file, wherein the decryption key is stored in the decryption key storing unit.

19. The method according to claim 18, further comprising:
when the apparatus does not comply with the security compliance requirements,
when the security compliance requirements are not stored in the compliance requirements storing unit, or
when a warning is received from security software, deleting the encryption key stored in the encryption key storing unit and the decryption key stored in the decryption key storing unit.

20. The method according to claim 18, further comprising:
sending an instruction to request the decryption key, user information, the encryption key ID corresponding to the decryption key to the server computer when the decryption key is not in the decryption key storing unit; and
in response to reception of the decryption key corresponding to the encryption key ID from the server computer, decrypting the encrypted sensitive file with the received decryption key.

21. A method for shielding a sensitive file on an apparatus that can connect to a server computer via a network, comprising:
requesting the server computer to verify user information of the apparatus and a version of security compliance requirements,
determining whether the apparatus complies with security compliance requirements sent from the server computer or not in response to a read instruction or a write instruction of the sensitive file by application software, wherein the security compliance requirements are stored in a compliance requirements storing unit;
when the user information and the version of the security compliance requirements are successfully verified,
in response to the write instruction,
executing
unlocking an encryption key storing unit
encrypting the sensitive file with an encryption key, wherein the encryption key is stored in the encryption key storing unit; and
embedding an encryption key ID corresponding to the encryption key in the encrypted file; or,
in response to the read instruction,
executing
unlocking a decryption key storing unit
decrypting the encrypted sensitive file with a decryption key corresponding to the encryption key ID embedded in the encrypted sensitive file, wherein the decryption key is stored in the decryption key storing unit, and
when the apparatus does not comply with the security compliance requirements,
executing
deleting the encryption key stored in the encryption key storing unit and the decryption key stored in the decryption key storing unit; and
requesting the server computer to send the security compliance requirements.

* * * * *